United States Patent [19]

Tury

[11] Patent Number: 4,817,471

[45] Date of Patent: Apr. 4, 1989

[54] ELECTRICAL CONTROL SYSTEM FOR CONTROL OF AN AUTOMATIC TRANSMISSION APPARATUS

[76] Inventor: Edward L. Tury, 9732 Rosemary La., Brighton, Mich. 48116

[21] Appl. No.: 108,812

[22] Filed: Oct. 15, 1987

Related U.S. Application Data

[63] Continuation-in-part of Ser. No. 62,755, Jun. 16, 1987, Pat. No. 4,790,204.

[51] Int. Cl.4 ...................... B60K 41/18; B60K 20/10
[52] U.S. Cl. .......................................... 74/866; 74/335
[58] Field of Search ................. 74/866, 878, 850, 335; 192/4 A

[56] References Cited

U.S. PATENT DOCUMENTS

| | | | |
|---|---|---|---|
| 2,578,142 | 12/1951 | Mayrath | 74/472 |
| 2,578,158 | 12/1951 | Toot | 192/0.073 |
| 2,631,701 | 3/1953 | Ainsworth | 192/0.073 |
| 2,634,838 | 4/1953 | Price | 192/0.073 |
| 2,658,683 | 8/1956 | Randol | 192/0.048 |
| 3,106,852 | 10/1963 | Miller | 74/365 |
| 3,130,596 | 4/1964 | Gorski | 74/365 |
| 3,335,618 | 8/1967 | Russey | 74/472 |
| 3,448,640 | 6/1969 | Nelson | 74/866 |
| 4,246,990 | 1/1981 | Strantz | 74/878 X |
| 4,262,783 | 4/1981 | Scarrott et al. | 74/866 X |
| 4,271,728 | 6/1981 | Wakamatsu | 74/866 |
| 4,493,228 | 1/1985 | Vukovich et al. | 74/866 X |
| 4,495,457 | 1/1985 | Stahl | 74/866 X |
| 4,572,340 | 5/1986 | Pierce | 192/4 C |
| 4,602,528 | 7/1986 | Bailey | 74/866 X |
| 4,621,328 | 11/1986 | Arai et al. | 74/335 X |
| 4,629,043 | 12/1986 | Matsuo et al. | 192/4 A |
| 4,638,690 | 1/1987 | Hattori et al. | 74/866 |
| 4,664,217 | 5/1987 | Welch et al. | 180/247 |

FOREIGN PATENT DOCUMENTS

| | | | |
|---|---|---|---|
| 0134646 | 6/1984 | European Pat. Off. | |
| 0246353 | 5/1986 | European Pat. Off. | |
| 0137647 | 8/1983 | Japan | 74/335 |
| 0040850 | 3/1985 | Japan | 74/866 |
| 832007 | 7/1957 | United Kingdom | |
| 863327 | 6/1959 | United Kingdom | |
| 2081926 | 2/1982 | United Kingdom | 74/335 |

OTHER PUBLICATIONS 2 pages from the Rolls Royce manual—"Electric System Transmission (Automatic Gearbox)".
SAE Technical Paper Series—Nov. 7-10, 1983.
SAE Technical Paper Series Feb. 27-Mar. 2, 1984.

*Primary Examiner*—Dirk Wright
*Attorney, Agent, or Firm*—Krass & Young

[57] ABSTRACT

The present invention is an electrical control apparatus for control of an automatic transmission in a motor vehicle. The automatic transmission has a motor for controlling the transmission state. The electrical control apparatus includes an operator input device, preferably a set of push buttons, for generating a desired transmission state signal, a transmission state sensing device for generating a present transmission state signal, and a logic control unit for control of the transmission motor. If the desired transmission state differs from the present transmission state, then the logic control unit generates either a clockwise motor drive signal or a counter-clockwise motor drive signal as needed to reach the desired transmission state. A motor drive circuit controls the motor for motion corresponding to the received drive signal. The control logic unit preferably also includes logic for inhibiting the generation of the clockwise and counter-clockwise motor control signals upon detection of an unsafe circumstance which would make a particular shift hazardous or harmful to the vehicle.

44 Claims, 9 Drawing Sheets

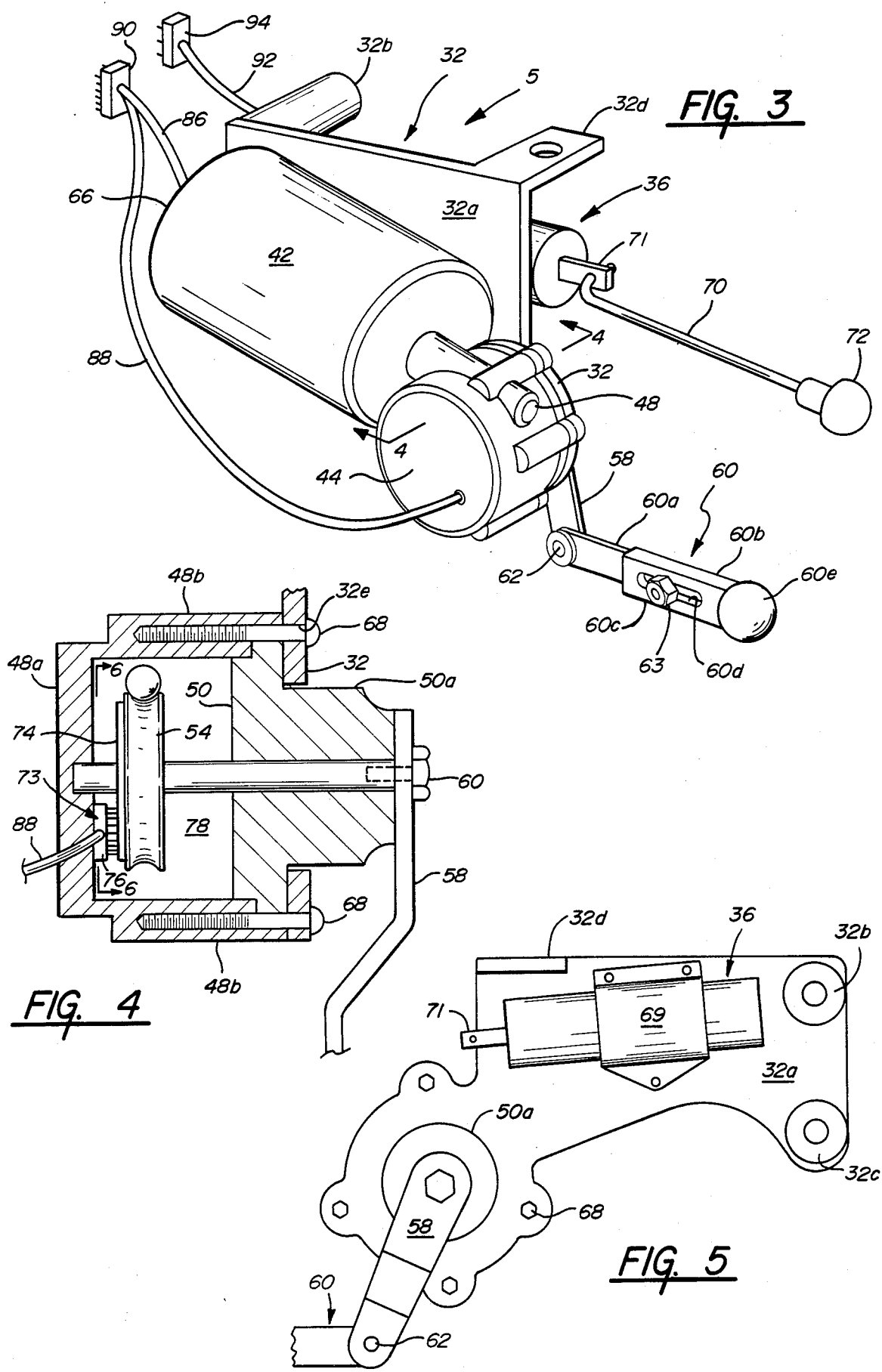

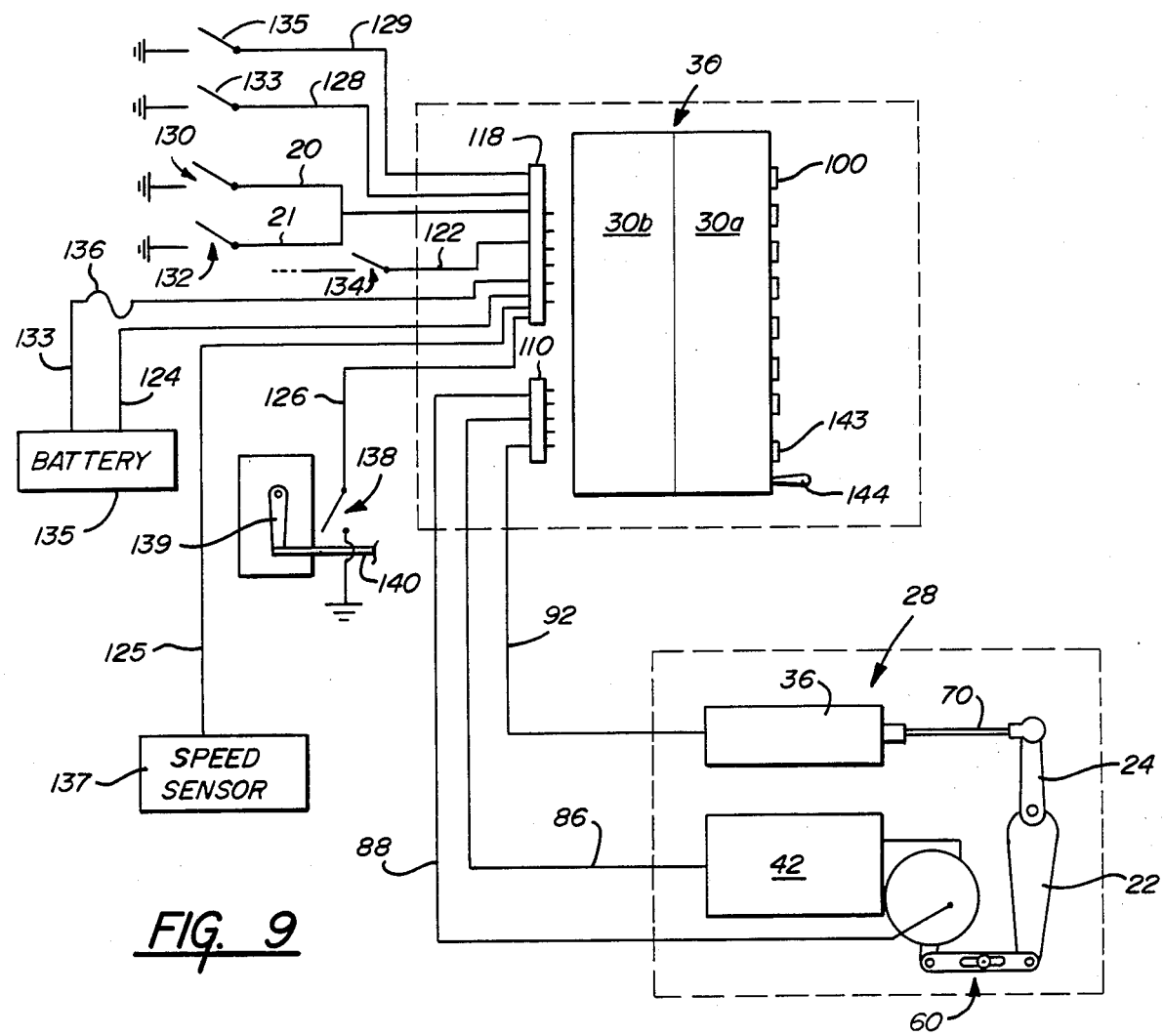
FIG. 9
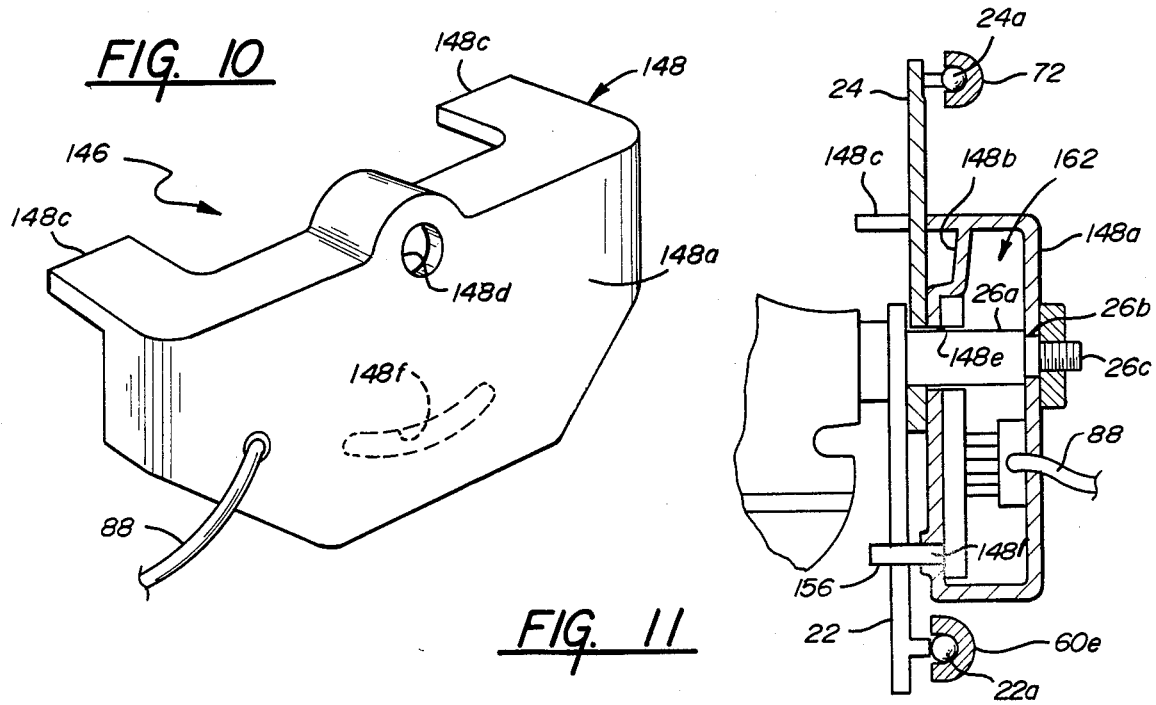
FIG. 10
FIG. 11

ELECTRICAL CONTROL SYSTEM FOR CONTROL OF AN AUTOMATIC TRANSMISSION APPARATUS

CROSS-REFERENCE TO RELATED APPLICATION

The present application is a continuation-in-part of U.S. patent application Ser. No. 62,775 filed June 16, 1987 and now U.S. Pat. No. 4,790,204.

BACKGROUND OF THE INVENTION

This invention relates to an electric shift apparatus especially suited for use with a motor vehicle having an automatic transmission.

Motor vehicles since their inception have required some manner of gear change mechanism to satisfy the varying torque and speed requirements encountered during the typical duty cycle of a motor vehicle. For many years these gear change mechanisms were manual in the sense that they required an operator input from a shift lever or the like to effect each desired gear change ratio. More recently, so called "automatic transmissions have become popular in which much of the shifting is done without operator input in response to sensed speed and throttle opening parameters. These automatic transmissions typically include a mode select lever positioned on the transmission housing and movable between a plurality of selectively pivoted positions corresponding to a respective plurality of shift modes within the transmission. The mode select lever is pivotally moved between its several shift positions by a cable or linkage mechanism extending from the mode select lever to a suitable gear selector lever located in the passenger compartment of the vehicle. Various proposals have been made in the past to eliminate the mechanical interconnection between the driver operated lever and the mode select lever and provide instead an electrical signal generated by a suitable action on the part of the driver and transmitted electrically to some manner of power means arranged to move the mode select lever. None of these attempts to provide an electric shift mechanism for an automatic transmission of a motor vehicle have met with any degree of commercial success since they provided a slow or imprecise shifting action and/or have generated excessive warranty and maintenance costs.

SUMMARY OF THE INVENTION

This invention is directed to the provision of an electric control apparatus for the automatic transmission of a motor vehicle which provides positive and precise shifting, which is amenable to ready installation in the motor vehicle at the time of the original motor vehicle manufacture, and which is reliable in operation even over a long motor vehicle life.

The invention electric control apparatus is intended for use with a motor vehicle having an automatic transmission of the type including a mode select lever driven by a motor and a kick-down lever driven by a solenoid positioned outside of the transmission housing and mounted for pivotal movement at one end thereof about a common axis.

According to a feature of the present invention, the electrical control apparatus for control of an automatic transmission receives input signals corresponding to the desired transmission state and the present state of the transmission, and includes a logic control unit for determining if the desired transmission state differs from the present transmission state, and for generating a clockwise motor drive signal if the desired transmission state is clockwise of the present transmission state and a counter-clockwise motor drive signal if the desired transmission state is counter-clockwise of the present state, in the case in which the desired transmission state differs from the present transmission state, and includes a motor drive circuit connected to the motor driving the mode select lever for rotating this motor clockwise in response to the clockwise motor control signal and rotating this motor counter-clockwise in response to the counter-clockwise motor control signal.

According to a further feature of the present invention, the electrical control apparatus receives vehicle condition signals corresponding to operational conditions of the motor vehicle and the logic control unit inhibits the generation of either the clockwise motor control signal or the counter-clockwise motor control signal when the desired transmission state and the vehicle condition correspond to one of a selected set of unsafe circumstances. These unsafe circumstances may involve a vehicle speed greater than a predetermined vehicle speed corresponding to the desired transmission state. The vehicle condition signals may include a plurality of speed signals, each speed signal being active when a corresponding predetermined vehicle speed is exceeded.

According to a further feature of the present invention, the automatic transmission includes the transmission states of park, reverse, low 1 and low 2, and the logic control unit inhibits generation of either the clockwise motor control signal or the counter-clockwise motor control signal when a first vehicle speed signal indicates the speed of the motor vehicle exceeds a speed of approximately three miles an hour and the desired transmission state is park, a second vehicle speed signal indicates the speed of a motor vehicle exceeds a speed of approximately seven miles per hour and the desired transmission state is reverse, a third speed signal indicates the motor vehicle speed exceeds a speed of approximately twenty miles an hour and the desired transmission state is low 1 and a fourth speed signal indicates the speed of the motor vehicle exceeds a speed of approximately thirty miles an hour and the desired transmission state is low 2. These particular speeds have been selected for the particular vehicle of the preferred embodiment and other speeds would be selected as appropriate for another vehicle. In accordance with the present invention the four vehicle speed signals are simultaneously generated from a analog speed signal through a set of comparators, each comparator comparing the analog speed signal to a corresponding threshold level.

According to a further feature of the present invention, the logic control unit includes a timer for inhibiting generation of either the clockwise motor control signal or the counter-clockwise motor control signal if the desired transmission state differs from the present transmission state for longer than a predetermined period of time. This predetermined period of time is set to ensure that the desired transmission state would be reached under ordinary operations. Thus, exceeding this predetermined period of time indicates that some type of improper operation has resulted. Accordingly, the logic control unit ceases generation of the respective motor control signals under this condition.

According to a further feature of the present invention the motor driving the mode selection lever of the automatic transmission is electrically braked when neither the clockwise motor control signal nor the counter-clockwise motor control signal is generated.

According to a further feature of the present invention, the desired transmission state signal is generated by the manual actuation of one of a set of push-button switches, each push-button switch corresponding to one state of the automatic transmission. The electric control apparatus further includes a plurality of indicators, one disposed proximate to each of the manual push-button switches, one of the indicators being actuated in accordance with the transmission state signal. These indicators are preferably light emitting diodes connected to a variable illumination supply voltage, whereby their intensity is varied in accordance with the illumination intensity of other control instruments.

According to a further aspect of the present invention, the electrical control apparatus further includes a manual control enabling a generation of either the clockwise motor control signal or the counter-clockwise motor control signal. The manual control preferably includes a first momentary contact switch for generation of the clockwise motor control signal and a second momentary contact switch for generation of the counter-clockwise motor control signal.

According to a further feature of the present invention, the electrical control apparatus further includes an accelerator pedal switch indicating full depression of the accelerator pedal and the logic control unit generates a signal for actuation of the solenoid driving the kick-down lever upon actuation of the accelerator pedal switch.

In accordance with the preferred embodiment of the present invention the motor drive circuit provides dynamic braking. When a clockwise control signal is generated, the motor drive circuit applies electric power to the motor in a first polarity for clockwise motion. When a counter-clockwise control signal is generated, the motor drive circuit applies electric power to the motor in the opposite polarity for counter-clockwise motion. If neither signal is generated, the motor drive circuit dynamically brakes the motor.

BRIEF DESCRIPTION OF THE DRAWINGS

FIG. 3 is a perspective view of a power module employed in the invention electric shift apparatus;

FIG. 4 is a fragmentary cross-sectional view taken on line 4—4 of FIG. 3;

FIG. 5 is a fragmentary view taken in the direction of the arrow 5 in FIG. 3;

FIG. 9 is a circuit diagram for the invention electric shift apparatus;

FIGS. 10, 11 and 12 are views of an alternate form of encoder mechanism for use in the invention electric shift apparatus;

DETAILED DESCRIPTION OF THE PREFERRED EMBODIMENT

Figure 1:
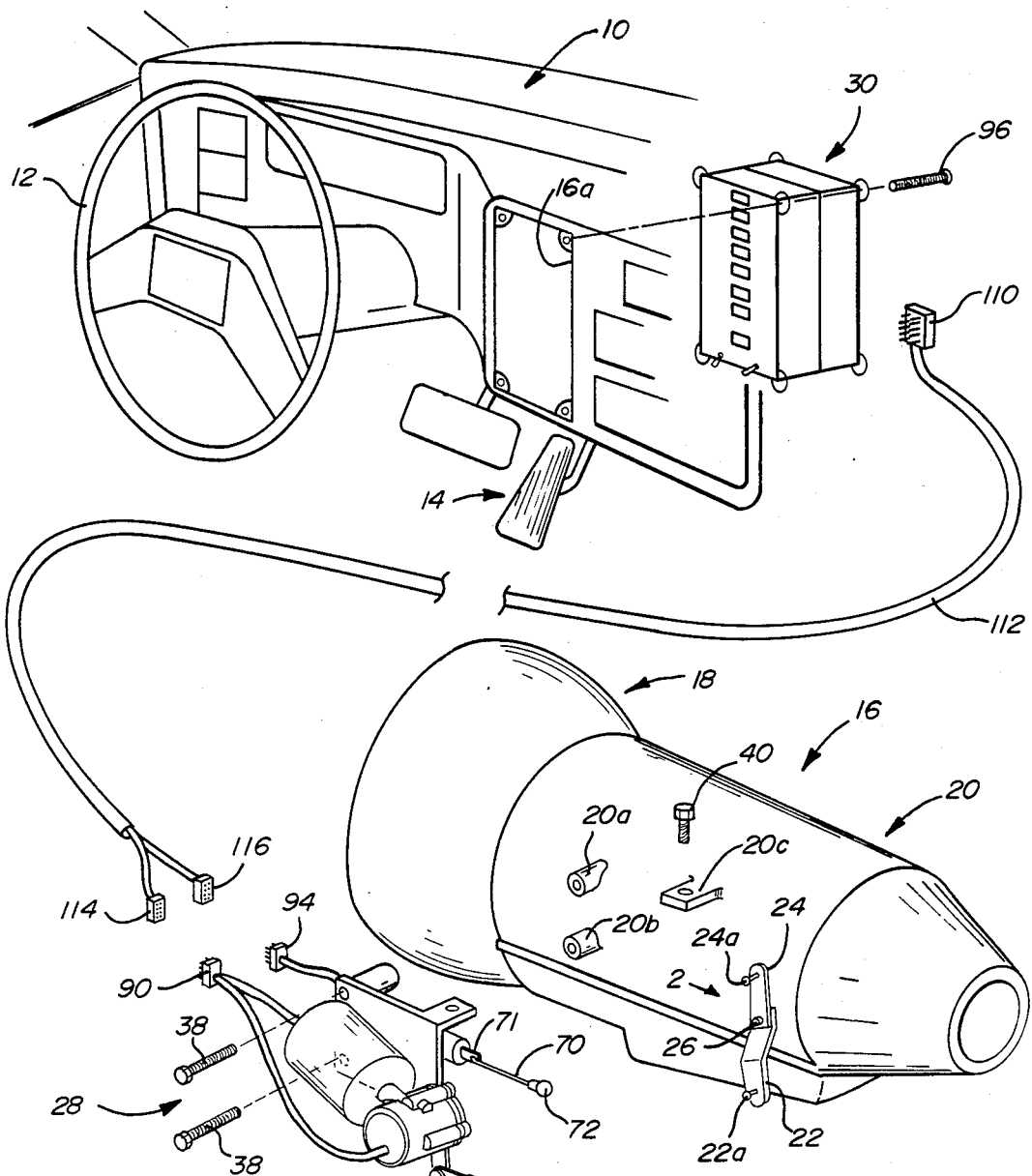
FIG. 1 is a fragmentary perspective view of a motor vehicle embodying the invention electric shift apparatus.
Figure 2:
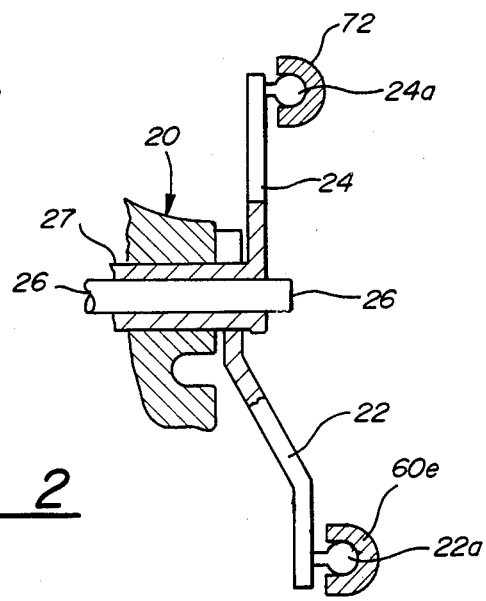
FIG. 2 is a fragmentary view looking in the direction of the arrow 2 in FIG. 1.
Figure 6:
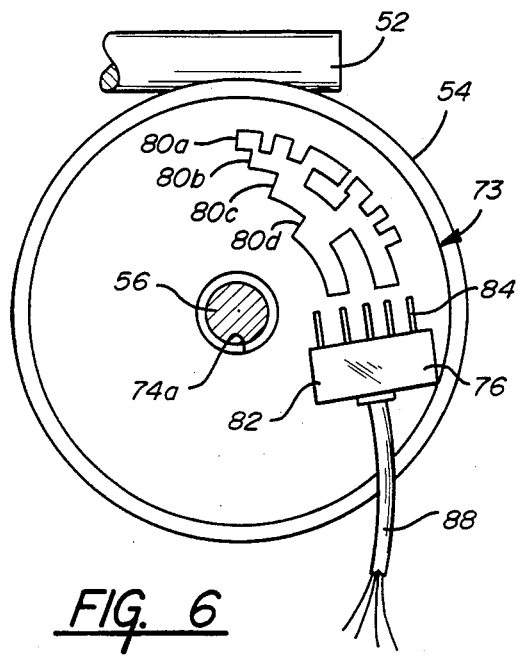
FIG. 6 is a cross-sectional view taken on line 6—6 of FIG. 4.
Figure 7:
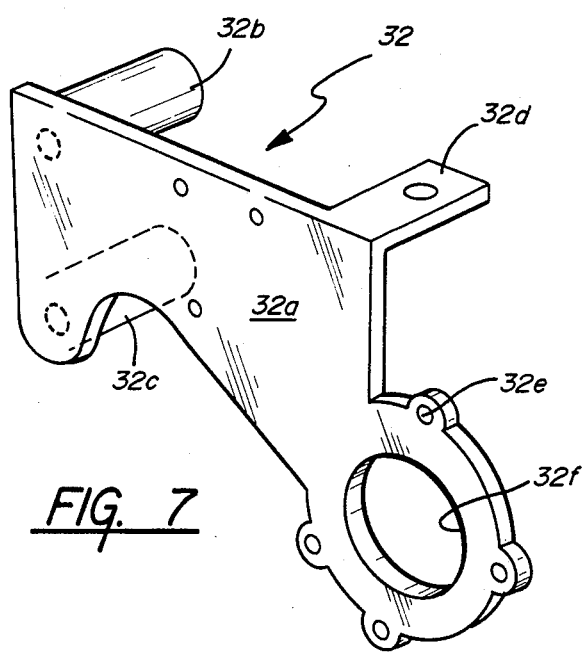
FIG. 7 is a perspective view of a bracket employed in the power module of the invention.
Figure 8:
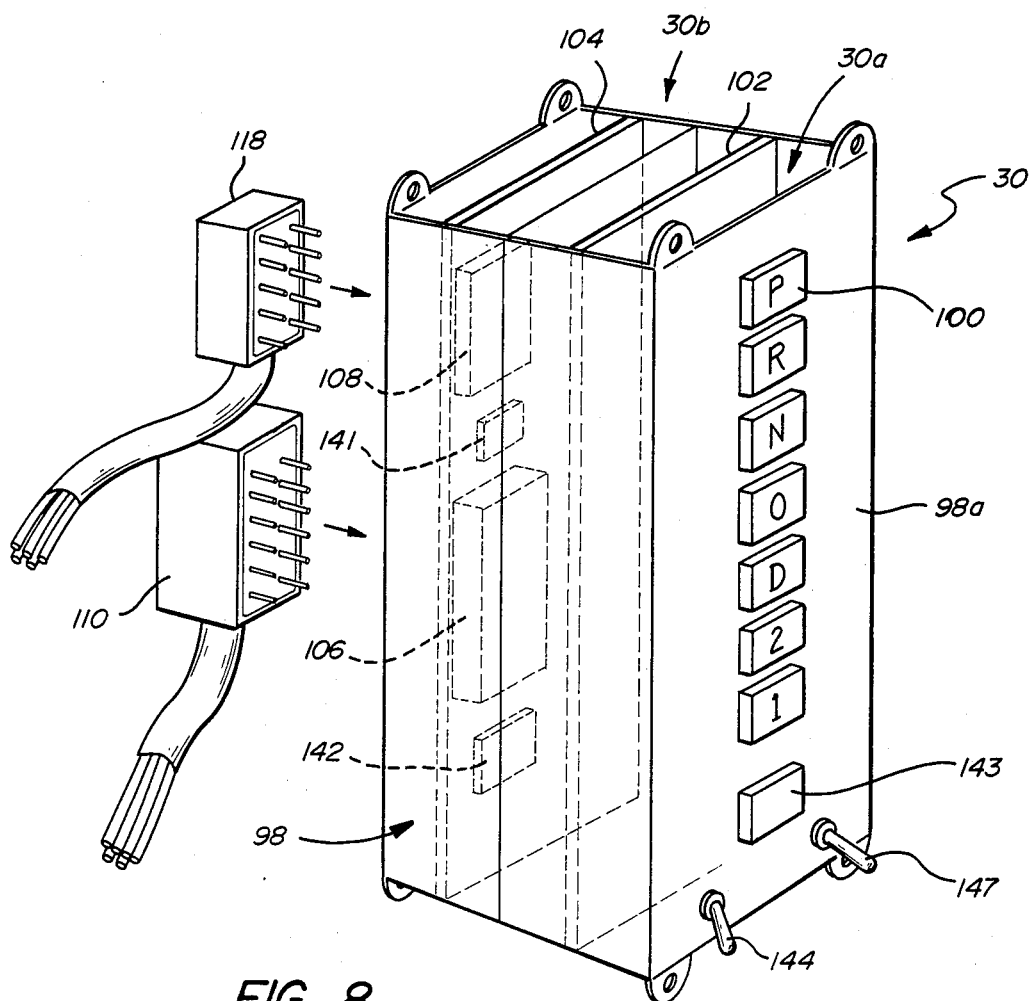
FIG. 8 is a fragmentary perspective view of a control module employed in the electric shift apparatus of the invention.

The electric shift apparatus including the electrical control system of the present invention is seen schematically in FIG. 1 in association with a motor vehicle of the type including an instrument panel assembly 10 positioned within the passenger compartment of the motor vehicle; a steering wheel 12 associated with the instrument panel; an accelerator pedal assembly 14; and an automatic transmission assembly 16 including a torque converter 18 and a transmission 20. Transmission 20 includes a mode select lever 22 and a kick-down lever 24 each mounted externally of the transmission housing for pivotal movement at one end thereof about a common axis. Specifically, kick-down lever 24 is fixedly mounted at its lower end on a shaft 26 and mode select lever 22 is fixedly mounted at its upper end on a tubular shaft 27 (see FIG. 2) mounted concentrically on shaft 26. It will be understood that selected pivotal movement of mode select lever 22 rotates tubular shaft 27 to operate internal devices within the transmission to position the transmission in a plurality of transmission modes such as park, neutral, drive, etc., and that pivotal movement of kick-down lever 24 rotates shaft 26 to operate internal devices within the transmission to the next lower gear for passing purposes or the like.

Power module 28 is adapted to be bolted to the transmission in proximity to levers 22 and 24 and includes a bracket 32, a motor assembly 34, and a solenoid 36.

Bracket 32 may be formed as a die casting and includes a planar main body portion 32a, lug portions 32b and 32c and a flange portion 32d. Bracket 32 is readily bolted to the housing of transmission 20 by bolts 38 passing through lugs 32b and 32c for threaded engagement with threaded bosses 20a and 20b on the transmission housing, and by a bolt 40 passing downwardly through an aperture in a flange 32 on the transmission housing for threaded engagement with a lug 20c on the transmission. Bosses 20a and 20b and lug 20c are already present on a typical automatic transmission housing and therefore need not be especially provided to carry out the invention.

Motor assembly 34 includes a DC electric motor 42, a speed reduction unit 44, and a lever assembly 46.

Motor 42 is direct current and may for example have an output torque rating of 200 inch pounds.

Speed reduction unit 44 is suitably secured to motor 42 and includes a housing 48, a cover plate 50 having a central hub member 50a, a worm gear 52 co-axial with the output drive of the motor 42, a worm wheel 54 driven by worm gear 52, and an output shaft 56 driven by worm wheel 54 and journalled in cover plate 50 and in an end wall 48a of housing 48.

Lever assembly 46 includes a first lever 58 secured by a nut 60 to the free end of speed reduction unit output shaft 56, and a second lever 60 secured by pivot means 62 to the free end of lever 58. Lever 60 is a compound member and includes sections 60a and 60b. Section 60b telescopically receives section 60a and with a pin 60c carried by section 60a guiding in a slot 60d in section 60b to allow the two sections to move axially relative to each other to vary the effective length of lever 60. The two sections may be locked in any selected position of adjustment by a nut 63 carried by pin 60c. The free end of lever 60 comprises a plastic snap fitting 60e for snapping engagement with a ball fitting 22a on the free end of mode select lever 22.

Figure 13:
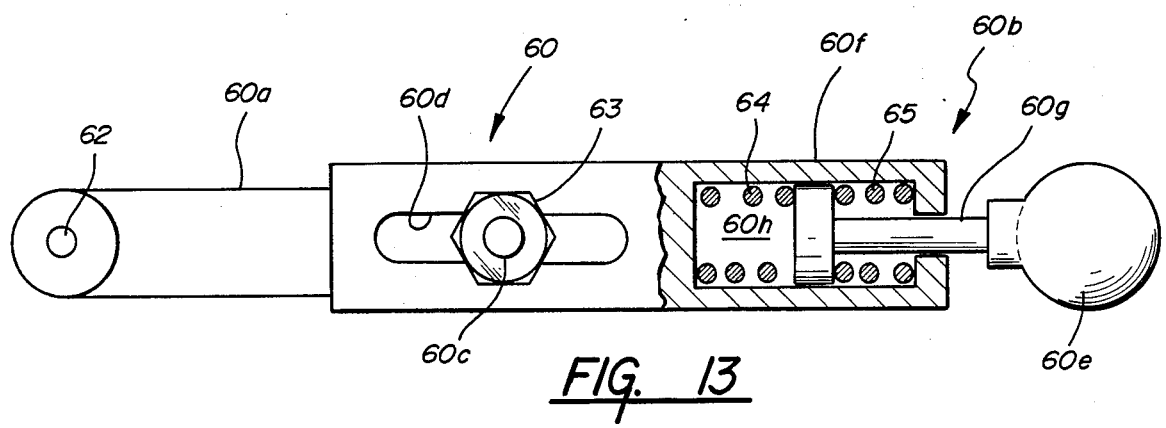
FIG. 13 is a view of a modified lever assembly for use in the invention electric shift apparatus.

A modified version of compound lever 60 is shown in FIG. 13. In the arrangement of FIG. 13, lever section 60b of compound lever 60 is itself a compound member including a first member of 60f and a second member 60g. Member 60f is connected by slot 60d and pin 60c to lever section 60a and defines a central cavity 60h. Member 60g carries snap fitting 60e at its free end and is slidably received at its other end in cavity 60h with a pair of matched coil springs 64,65 positioned in cavity 60h and engaging opposite sides of a piston member 60i mounted on member 60g in cavity 60h.

The motor assembly 34 is mounted on the outboard face of the planar main body portion 32a of bracket 32. Specifically, motor 42 is mounted to the outboard face of bracket portion 32a by a bracket 66 and speed reduction unit 44 is mounted to the outboard face of bracket portion 32a by a plurality of circumferentially spaced bolts 68 passing through apertures 32e in bracket 32 and through suitable apertures in speed reduction unit cover plate 50 for engagement with threaded bosses 48b spaced circumferentially about housing 48. In assembled relation, the hub portion 50a of cover plate 50 passes through aperture 32f in bracket 32 to position lever 58 on the inboard face of the bracket.

Solenoid 36 may comprise for example a pull type unit capable of generating three pounds of pull and having a stroke of between three-eighths and one-half inch. Solenoid 36 is secured to the inboard face of planar main body portion 32a of brackets 32 by a clamp 69. A cable 70 is secured to the plunger 71 of the solenoid and a plastic snap fitting 72 is secured to the free end of cable 70.

Power module 28 further includes an encoder assembly 73 operative to sense the shift position of the transmission and generate an encoded signal representative of the sensed shift position.

Encoder assembly 73 includes an encoder wheel 74 and a pick-up device 76. Encoder wheel 74 may be formed for example of a suitable plastic material with conductive coating and is positioned on a side face of worm wheel 54 within the closed and sealed interior chamber 78 defined by housing 48 and cover plate 50. Encoder wheel 74 includes a central aperture 74a passing speed reduction unit output shaft 56 and further includes code indicia 80 provided on the exposed outer face of the wheel and arranged along four arcuate tracks 80a, 80b, 80c and 80d centered on the center line of the encoder wheel.

Pick-up device 76 includes a body member 82 mounting a plurality of flexible resilient contact fingers 84 for respective coaction with indicia tracks 80a, 80b, 80c and 80d. In addition to the four fingers 84 for respective engagement with the four indicia tracks, a fifth finger is provided to provide a ground for the system.

A lead 86 from motor 42 and a lead 88 from pick-up device 76 are combined into a pin-type plug 90 and a lead 92 from solenoid 36 terminates in a pin-type plug 94.

Control module 30 is intended for ready installation in an opening 10a in instrument panel 10 or a center console disposed between the two front seats by insertion of the module from the rear of the housing and fastening of the module within opening 10a by the use of several fasteners such as seen at 96. Module 30 includes a housing structure 98 of general box-like configuration enclosing an operator access or push-button submodule 30a and a logic submodule 30b.

Push-button submodule 30a includes a plurality of push-buttons 100 positioned in vertically spaced relation in the front face 98a of the module housing and corresponding to the available transmission shift modes. Specifically, buttons 100 include buttons corresponding to park, reverse, neutral, overdrive, drive, second and first shift positions for the transmission. Buttons 100 coact in known manner with a printed circuit board 102 to generate suitable electrical signals in response to respective depression of the buttons 100.

Logic submodule 30b includes an electronic printed circuit board 104 suitably electrically connected to printed circuit 102 and suitably mounting a first plurality of connector terminals 106 and a second plurality of connector terminals 108. Connector terminals 106 coact with a pin-type plug 110 at the end of a cable 112. Cable 112 includes plugs 114 and 116 at its remote end for plugging receipt of plugs 90 and 94 so that plug 110 embodies the information from leads 86, 88 and 92. Connector terminals 108 coact with a pin-type plug 118. Plug 118 embodies the information from leads 120, 121, 122, 123, 124, 125, 126, 128 and 129. Lead 120 is associated with a switch 130 sensing the open or closed position of the driver's door of the vehicle; lead 121 is associated with a switch 132 sensing the presence or absence of a driver on the driver's seat of the vehicle; lead 122 senses the open or closed condition of the ignition switch 134 of the vehicle; leads 123 and 124 are connected to the negative and positive terminals of the vehicle battery 135 with a suitable fuse 136 in lead 123; lead 125 is connected to a speed sensor 137 which provides information with respect to the instantaneous speed which the vehicle is traveling; and lead 126 is connected with a switch 138 which is closed in response to movement of throttle lever 139 to its extreme open throttle position by a cable 140 connected in known manner to the accelerator assembly 14 of the vehicle. Lead 128 is connected with brake switch 133 which senses whether or not the brake is actuated. Lead 129 is connected with seat belt switch 135 which senses whether or not the driver's seat belt is fastened.

The electric shift assembly is delivered to the vehicle manufacturer in the form of power module 28 and control module 30. During the assembly of the vehicle, the power module 28 is mounted on the transmission housing proximate the control levers 24 and 26 and the control module 30 is mounted in the instrument panel 10, whereafter plugs 90 and 94 are plugged into plugs 114 and 116 and plugs 110 and 118 are plugged into control module 30 to complete the assembly of the invention electric shift apparatus.

The mounting of power module 28 on the transmission housing is accomplished simply by passing bolts 38 through bosses 32b and 32c for threaded engagement with transmission housing bosses 20a and 20b, passing bolt 40 through lug 32d for threaded engagement with transmission housing lug 20c, and snapping snap fittings 60e and 72 respectively over ball fitting 22a on the free end of mode select lever 22 and a ball fitting 24a on the free end of kick-down lever 24. As the lever assembly 46 is connected to the mode select lever, lever sections 60a and 60b of lever 60 move telescopically and selectively relative to each other to provide the precise effective length of length 60 to allow positive snapping engagement of snap fitting 60e over ball 22a irrespective of manufacturing tolerances, whereafter nut 64 is tightened to lock the lever 60 in its precise adjusted position.

Installation of control module 30 in instrument panel 10 is affected simply by moving the control module from the rear of the panel into the opening 10a and fastening the module in place by the use of fasteners 96 or the like. Following the plugging of plugs 90 and 94 into plugs 114 and 116 and the plugging of plugs 110 and 118 into connector terminals 106 and 108, the system is operational and ready for use.

Figure 14:
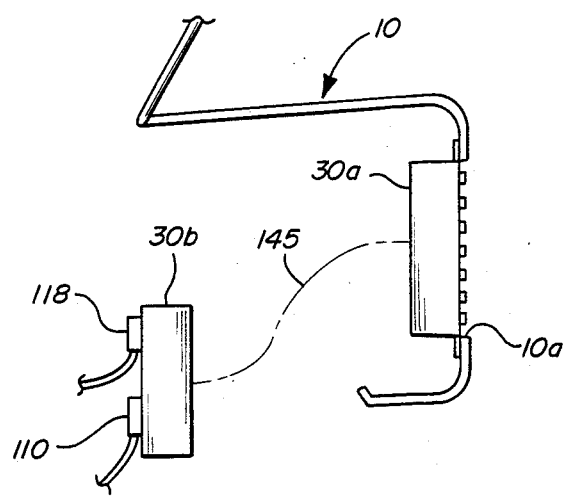
FIG. 14 is a view of a modified system for mounting the invention control module in the vehicle.

Alternatively, in situations where space immediately behind the fascia of the instrument panel is limited, submodules 30a and 30b may be designed and delivered as separate units with push-button submodule 30a mounted a previously described in opening 10a of the instrument panel or center console and logic submodule 30b mounted elsewhere in the general environment of the instrument panel and connected to push-button submodule 30a in known manner by suitable wiring. For example, as seen in FIG. 14, push-button submodule 30a may be mounted in instrument panel opening 10a and logic submodule 30b may be mounted in the general area behind and below the facia of the instrument panel 10 with the submodules interconnected by wiring seen generally at 145.

Figure 15:
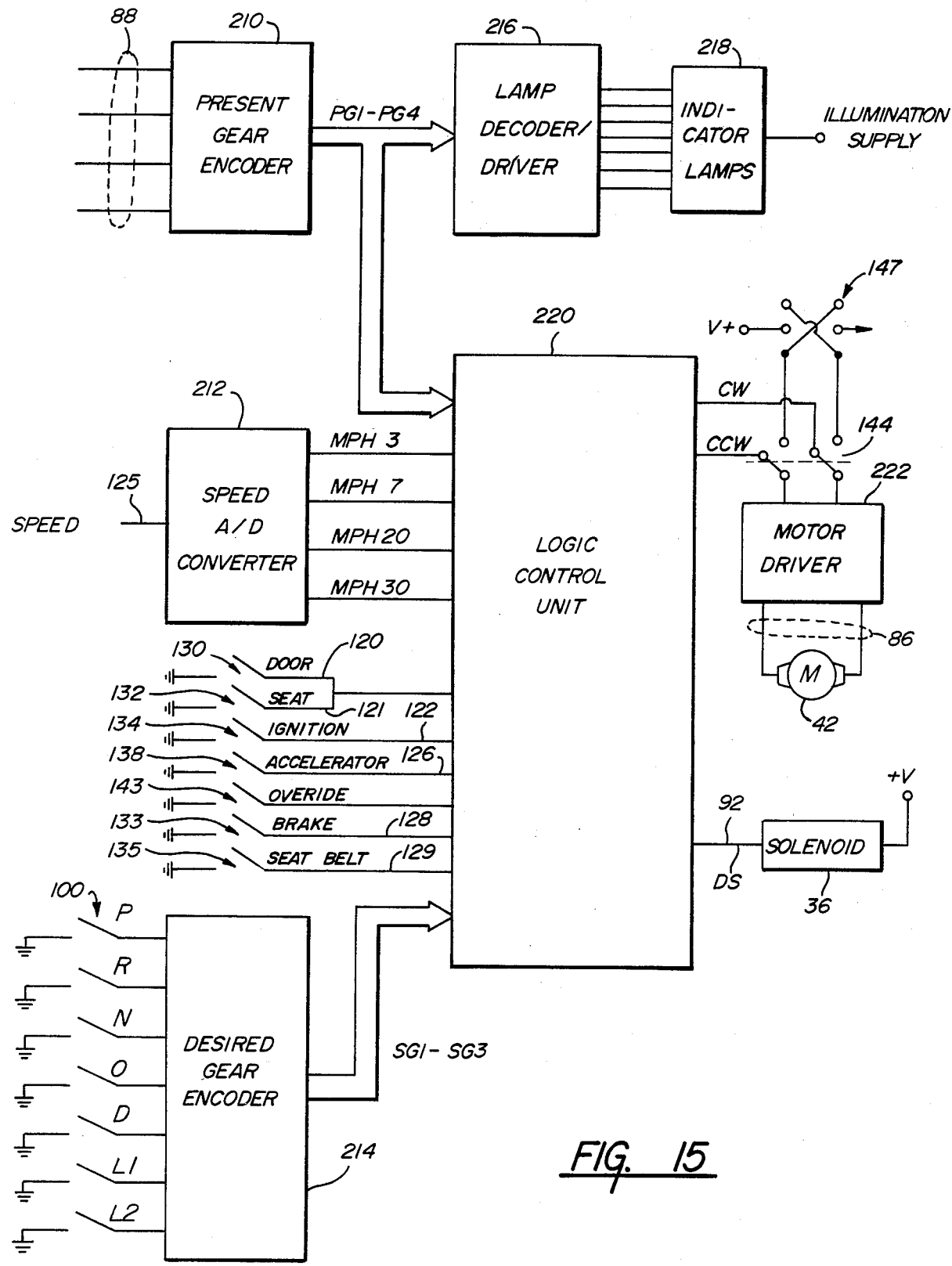
FIG. 15 is a schematic view of the electrical control system of the present invention.

FIG. 15 illustrates a schematic block diagram of the electrical control system of the present invention. This block diagram includes present gear encoder 210, speed analog-to-digital converter 212, desired gear encoder 214, lamp decoder/driver 216, indicator lamps 218, logic control unit 220 and motor driver circuit 222.

Present gear encoder 210 is connected to the lines 88 which are output of the encoder assembly 73, described above. Present gear encoder 210 includes one or more integrated circuits to encode the output signal from encoder assembly 73 into four signals PG1 to PG4. This encoding takes place, for example, in accordance with the coding table listed in Table 1.

TABLE 1

|  | PG1 | PG2 | PG3 | PG4 |
|---|---|---|---|---|
| Park | 0 | 0 | 0 | 1-0 |
| Reverse | 1 | 0 | 0 | 1-0 |
| Neutral | 1 | 1 | 0 | 1-0 |
| Overdrive | 0 | 1 | 0 | 1-0 |
| Drive | 0 | 1 | 1 | 1-0 |
| Low1 | 1 | 1 | 1 | 1-0 |

TABLE 1-continued

|  | PG1 | PG2 | PG3 | PG4 |
|---|---|---|---|---|
| Low2 | 1 | 0 | 1 | 1-0 |

Figure 20:
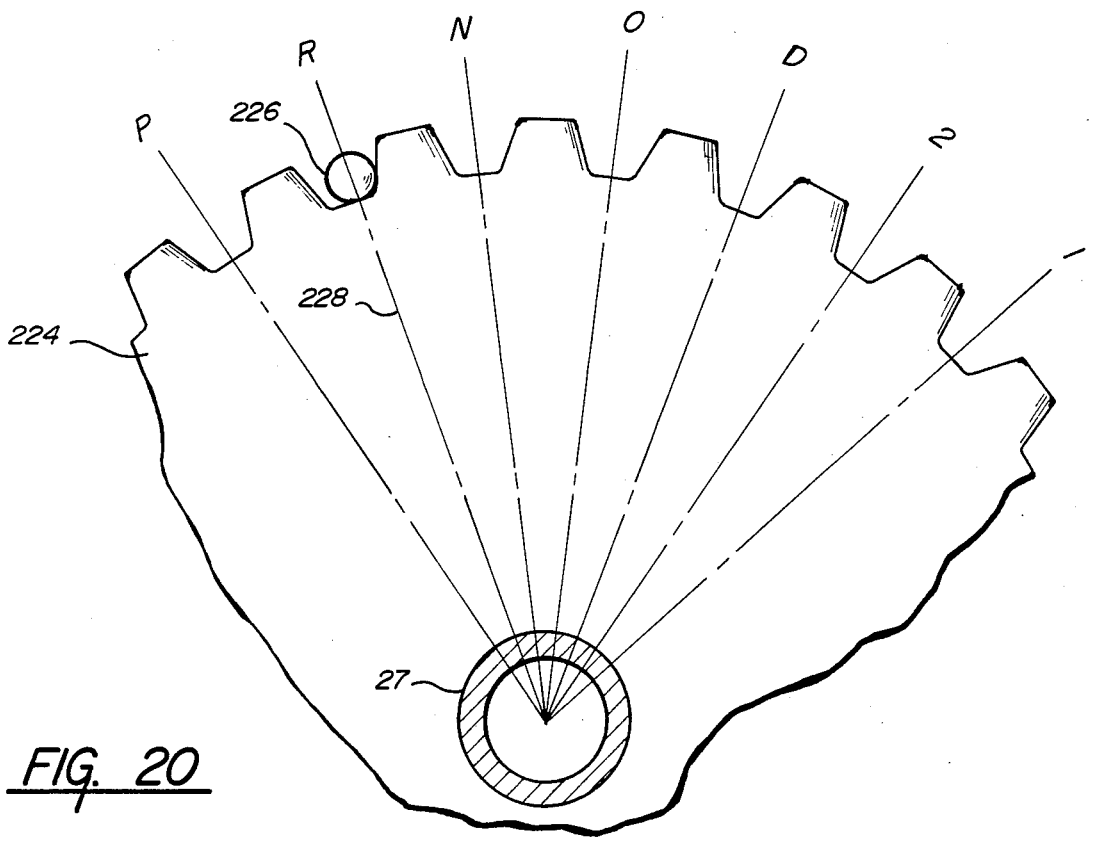
FIG. 20 is a somewhat schematic view of a roostertail member embodied in the transmission of the vehicle and illustrating the operation of the encoder mechanism to indicate the exact center of the range for each gear selected.

Each unique combination of signals PG1, PG2 and PG3 indicates the angular range for a corresponding gear. FIG. 20 illustrates a roostertail control member 224 of known form connected to tubular shaft 27 and positioned within the transmission housing. As seen in FIG. 20, the signal PG4 is used to indicate the exact center of any particular gear range as represented by positioning of the usual spring loaded follower 226 in the precise dead center of the valley of the roostertail corresponding to the particular gear being selected. The encoder assembly 73 causes signal PG4 to change from "1" to "0" when the exact center of the angular range of the selected gear is reached. When this transistion in PG4 is detected, then the signals PG1, PG2 and PG3 are latched into the logic. This encoding technique ensures the mode select lever 22 is precisely positioned when the DC electric motor 42 is stopped. As a consequence the tramission is reliably positioned in the desired gear at the bottom of the valley of the roostertail corresponding to the desired gear. For example, as seen in FIG. 20, when R is selected by the vehicle operator, the described encoding technique ensures that the follower 226 comes to rest at the angular position 228 corresponding to bottom dead center of the roostertail valley corresponding to the reverse gear mode of the transmission.

Speed analog-to-digital converter 212 receives an analog signal indicative of speed on line 125. Speed analog-to-digital converter 212 generates an output signal on one or more of the output lines MPH3, MPH7, MPH20 and MPH30, depending upon the magnitude of the analog speed signal.

Figure 16:
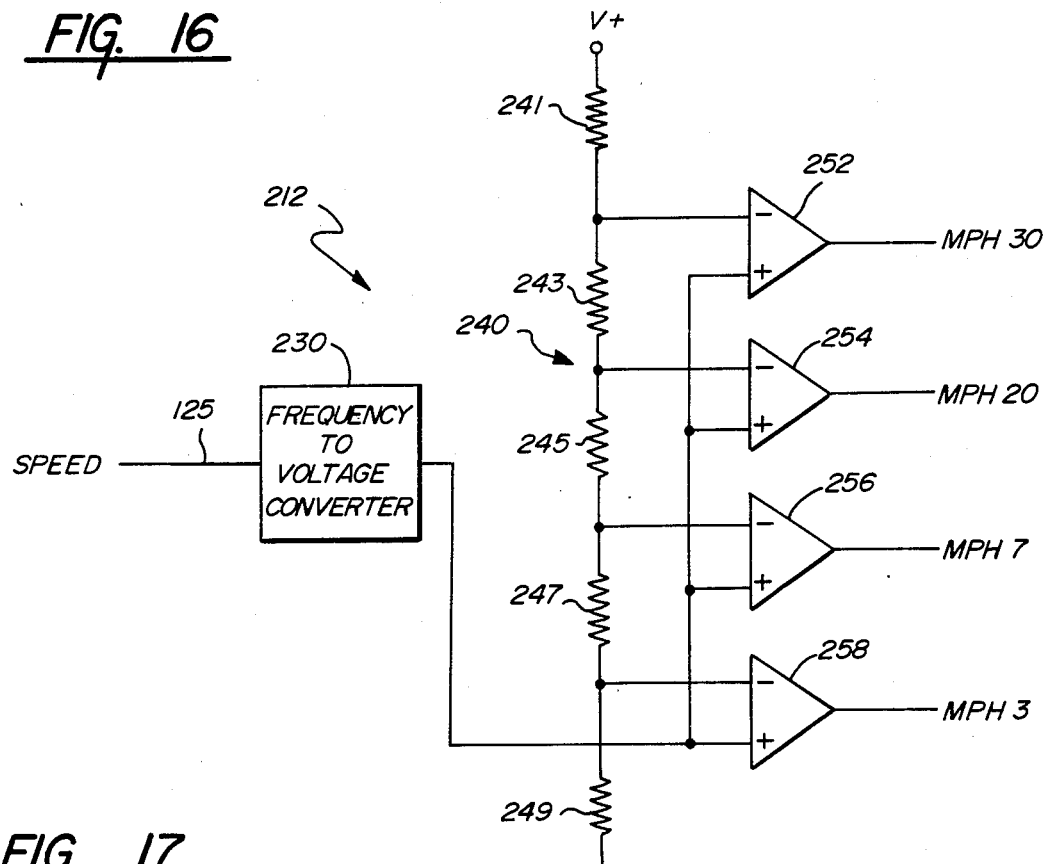
FIG. 16 is a more detailed schematic view of the speed analog-to-digital converter illustrated in FIG. 15.

FIG. 16 illustrates in schematic form the preferred construction of speed analog-to-digital converter 212. In accordance with the preferred embodiment the speed signal comes from an existing sensor on the vehicle which generates an oscillating signal having a frequency proportional to the vehicle speed. The speed signal is applied to a frequency-to-voltage converter 230 and then to the positive input of each of a set of comparators 252, 254, 256 and 258. A voltage divider circuit 240 comprising resistors 241, 243, 245, 247 and 249 is connected between the positive supply voltage and ground. The node between resistors 241 and 243 is connected to the negative input of comparator 252; the node between resistors 243 and 245 is connected to the negative input of comparator 254; the node between resistors 245 and 247 is connected to the negative input of comparator 254; and the node between resistors 247 and 249 is connected to the negative input of comparator 258. Each of these comparator circuits 252 to 258 receives a reference voltage for comparison to the output from frequency-to-voltage converter 230. If the output from frequency-to-voltage converter 230 is greater than the reference voltage applied to comparator 252, this indicates a vehicle speed of greater than 30 miles per hour. Accordingly, the output of comparator 252 is the MPH30 signal. Similarly, comparator 254 generates a signal at output MPH20 when the voltage at the output of frequency-to-voltage converter 230 indicates a vehicle speed of greater than 20 miles an hour. Comparator 256 generates an output MPH7 when the input indicates a vehicle speed of greater than seven miles per hour. Lastly, comparator 258 generates an output MPH3 when the speed input signal indicates a vehicle speed of greater than three miles per hour. Each of these four digital speed signals are supplied to logic control unit 220, to be used in a manner which will be further disclosed below.

Desired gear encoder 214 is coupled to the plurality of push-buttons 100 employed to select the desired gear. Desired gear encoder 214 includes one or more integrated circuits which encode the last actuated switch 100 into a three-bit signal on lines SG1 to SG3. This encoding takes place, for example, in accordance with the coding table listed at Table 2.

TABLE 2

|  | SG1 | SG2 | SG3 |
|---|---|---|---|
| Park | 1 | 1 | 1 |
| Reverse | 1 | 1 | 0 |
| Neutral | 1 | 0 | 1 |
| Overdrive | 1 | 0 | 0 |
| Drive | 0 | 1 | 1 |
| Low1 | 0 | 1 | 0 |
| Low2 | 0 | 0 | 1 |

A bus of these three lines SG1 to SG2 is supplied from desired gear encoder 214 to logic control unit 220. This bus indicates to logic control unit 220 the desired transmission state selected by the operator.

Lamp decoder/driver 216 receives the encoded present gear signal on the bus including the lines PG1 to PG4. Lamp decoder/driver 216 generates a signal to illuminate a single light of indicator lamps 218. In accordance with the preferred embodiment of the present invention each of the lamps of indicator lamps 218 is associated with one of the push-button switches 100. In particular, it is desirable that push-buttons 100 comprise lighted push-button switches with the indicator lamps enclosed therein. The individual indicator lamps are preferably connected to the illumination supply in a manner that enables the intensity of these lamps to be adjusted in accordance with the adjustment of the intensity of the interior instruments.

Figure 17:
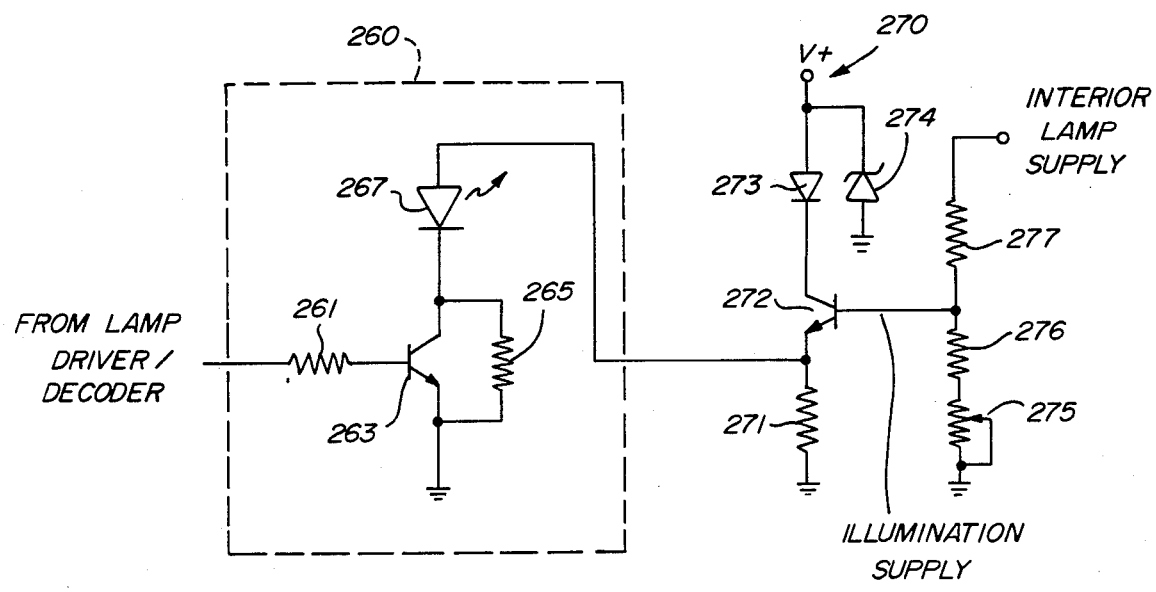
FIG. 17 is a schematic view of a typical indicator lamp circuit including its connection to the variable illumination supply.

FIG. 17 illustrates circuit 260 of a typical indicator lamp 267. In this illustration indicator lamp 267 is a light emitting diode. A resistor 261 is connected to lamp decoder/driver 216 for supplying a bias current to the base of transistor 263. When transistor 263 is turned on lamp 267 shines with a first brightness. When transistor 263 is turned off resistor 265 carries the current through lamp 267, so that lamp 267 is illuminated with a second, lower intensity. The voltage supplied to lamp 267 comes from power supply 270. The interior lamp supply is applied to a voltage divider including potentiometer 275, and resistors 276 and 277. The voltage appearing at the node between resistors 276 and 277 depends upon the setting of potentiometer 275. This voltage supplies a base current to transistor 272 which is connected in an emitter follower circuit. The emitter current from transistor 272 flows through the selected lamp and through resistor 271. Diode 273 provides reverse voltage protection for transistor 272. Zener diode 274 supplies over voltage protection for transistor 272. In accordance with the preferred embodiment, adjustment of the instrument intensity via potentiometer 275 adjusts the intensity of the illunination of the indicator lamps 218.

Additional switches are connected to logic control unit 220. These include door switch 130, which indicates the open/closed status of the driver's door, seat switch 132 indicating whether or not the driver's seat is occupied, ignition switch 134 indicating the status of the ignition switch, accelerator switch 138 which indicates the full depression of accelerator pedal 138 and override switch 143. Brake switch 133 indicates the depression of the brake pedal and seat belt switch 135 indicates the closure of the driver's seat belt. Logic control unit 220 receives the above described input signals and generates three output signals. These include the clockwise motor drive signal and the counter-clockwise motor drive signal which are connected to motor driver circuit 220. In addition a down shift signal 92 is connected to solenoid 36 for effecting the down shifting of the transmission via kick-down lever 24.

In use various input signals, such as described above and illustrated in FIGS. 9 and 15, are supplied to logic control unit 220. Logic control unit 220 is configured to receive these input signals and generate the necessary drive signals to motor 42 and solenoid 36 for providing the selection of the desired gear. Logic control unit 220 could be constructed of a programmed microprocessor circuit. It is believed preferable to construct logic control unit 220 in hardware logic in a programmable logic array or a gate array. Hardware logic is believed preferable to a programmed microprocessor because there is no software to maintain, the development of the logic circuit is easier and the cost is lower. The following description of the action of logic control units 220 is made in relation to Boolean equations which can be embodied in the logic circuits of a programmable logic array or gate array. Those skilled in the art would understand that it is equally possible to perform the same Boolean operations with a programmable microprocessor circuit.

The operation of logic control unit 220 will now be described. Firstly, the various input signals are formed into a set of logic signals. The signals SG1 to SG3 are decoded into a set of signals whose state is selected by the depressed push-button 100; PARK, RVRS, NTRL, OVDR, DRVE, LOW1 and LOW2. One of these signals, corresponding to the desired gear selected by the depressed push-button, is a logic "1" while the other of these signals are a logic "0". Similarly the encoder signals PG1 to PG4 permit generation of a set of logic signals PGP, PG4, PGN, PGO, PGD, PGL1 and PGL2, one of which is active to indicate the present gear and the others of of which are inactive. This encoding and decoding technique is employed to reduce the number of lines required between the various circuits and to reduce the number of input lines to be connected to logic control unit 220. Logic control unit 220 receives the speed logic signals MPH3, MPH7, MPH20 and MPH30 from speed analog-to-digital converter 212. Logic control unit 220 forms signals from the additional inputs including DOOR indicating the opened/closed status of the driver's door via door switch 130, SEAT indicating whether or not the driver's seat is occupied via seat switch 132, IGN indicating the status of the ignition switch, ACC indicating whether or not accelerator switch 138 is closed, OVRD indicating override via switch 143, BRAKE indicating depression of the brake pedal via switch 133 and SBELT indicating the closure of the driver's seat belt via switch 135.

Logic control unit 220 serves to compare the inputs indicating the desired gear with the inputs indicating the present gear. If they differ, then logic control unit 220 generates an output signal to motor 42 to rotate the motor until the present gear matches the desired gear.

This process includes an indication of which shifts are upshifts (counter-clockwise motor rotation) and which are down shifts (clockwise motor rotation) according to the following Boolean equations:

UP1 = PGL1

UP2 = PGL2 and Not (LOW1)

UP3 = PGD and (not (LOW2) and Not (LOW1))

UP4 = PGO and ( NTRL or RVRS or PARK )

UP5 = PGN and ( RVRS or PARK )

UP6 = PGR and PARK

UPSHFT = UP1 or UP2 or UP3 or UP4 or UP5 or UP6

DNSHFT = Not (UPSHFT)

Thus an up shift is required if the present gear is low1 (UP1), or the present gear if low2 and low1 is not requested (UP2), or the present gear is drive and neither low1 nor low2 are requested (UP3), or the present gear is overdrive and either neutral, reverse or park is selected (UP4), or the present gear is neutral and either reverse or park is selected (UP5), or the present gear is reverse and park is selected. A down shift is requested if none of the intermediate states are satisfied, that is the inverse of UPSHFT.

Two motor control signals CCW and CW are generated when the signals ENABLE and OK2SHFT are active and the respective UPSHFT or DNSHFT is active and shown below.

CCW = ENABLE and OK2SHFT and UPSHFT

CW = ENABLE and OK2SHFT and DNSHFT

The ENABLE signal generally requires the desired gear to differ from the present gear and certain safety conditions to be satisfied. As shown below, ENABLE is inactive when the desired gear is the same as the present gear.

ENABLE = GOLOW1 or GOLOW2 or GODRVE or GOOVDR or GONTROL or GORVRS or GOPARK

These intermediate signals are formed as follows:

```
GOLOW1  = LOW1 and Not (PGL1) and Not(MPH30)
GOLOW2  = LOW2 and Not(PGL2) and Not(MPH20)
GODRVE  = DRVE and Not(PGD)
GOOVDR  = OVDR and Not(PGO)
GONTRL  = NTRL and Not(PGN)
GORVRS  = RVRS and Not(PGR) and Not(MPH7)
GOPARK  = ( PARK and Not (PGP) and Not(MPH3) ) or
          ( ( ( Not(IGN) or ( Not (DOOR) and Not(SEAT) ) ) and
          Not(PGP) and Not(MPH3) and Not(OVRD) ) )
```

Thus the logic control unit 220 does not permit a shift into low1 when the speed is in excess of 30 miles per hour, and likewise does not permit a shift to low2 if in excess of 20 miles per hour, to reverse if in excess of 7 miles per hour, or to park if in excess of 3 miles per hour. The second term in GOPARK automatically shifts to park if the ignition is switched off (Not(IGN)), or if the door is opened (Not(DOOR)) and the seat is empty (Not(SEAT)), the present gear is not park (Not(PGP)), the speed is not greater than 3 miles per hour (Not(MPH3)), and neutral override is not selected (Not(OVRD)).

The signal OK2SHFT is a safety lockout signal. It is formed as follows:

OK2SHFT = ( (IGN and SEAT) or OVRD) and Not(PGR and MPH7)

Thus OK2SHFT permits shifts if the ignition switch is enabled and the driver's seat is occupied, or if a gear is selected and the override switch 143 is activated. In either event shifts are not permitted if the transmission is currently in reverse gear and the vehicle speed is above 7 miles per hour. If desired OK2SHFT may also require connection of the driver's seat belt to enable any shift via the SBELT signal. Also, it may be desired to require depression of the brake to leave PARK gear by adding a term Not(PGP and Not (BRAKE)) to the equation for OK2SHFT.

Figure 18:
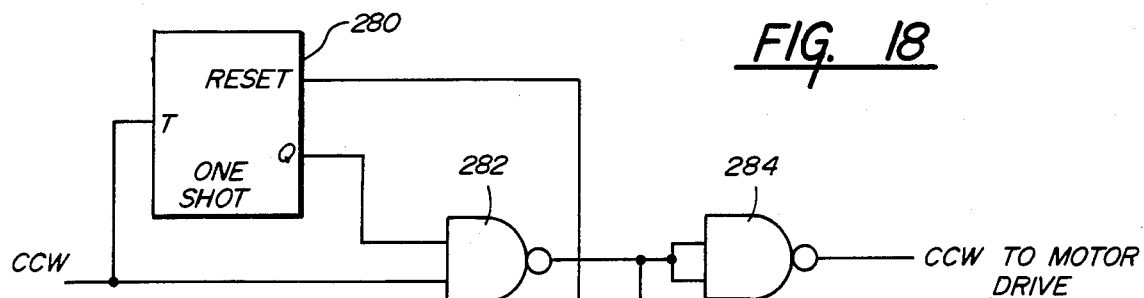
FIG. 18 is a schematic view of the timing circuit which ensures that the motor control signals are not generated for longer than a predetermined period of time.

The clockwise motor drive signal CW and the counter-clockwise motor drive signal CCW are generated by logic control unit 220 in accordance with the above Boolean equations. These signals are then conditioned via a one shot circuit before being applied to motor driver circuit 222. These one shot circuits are illustrated in FIG. 18. The counter-clockwise motor drive signal CCW is applied to the trigger input of one shot circuit 280 and one input of gate 282. Upon generation of this counter-clockwise motor drive signal CCW the state of one shot 280 is toggled to enable gate 282. At the same time, the output of NAND gate 282 is applied to the reset input of one shot 290, insuring that NAND gate 292 is cut off and the clockwise motor drive signal CW is inhibited. This signal is inverted via gate 284 and then applied to the motor driver circuit 222 in the manner illustrated in FIG. 15. When a predetermined period of time has elapsed one shot 280 reverses state. This serves to disable NAND gate 282 and stop the generation of the counter-clockwise motor drive signal CCW. This also removes the input to reset one shot 290, thereby permitting later generation of the clockwise motor drive signal CW. The length of time of one shot circuit 280 is set to be longer than the longest time for ordinary shifting. Thus if this time is exceeded some error condition has resulted and it is best to remove the motor drive from motor 42. A similar one shot circuit 290 operates on the clockwise motor drive signal CW utilizing NAND gate 292 and 294. The output of NAND gate 292 is also applied to the reset input of one shot 280 insuring that NAND gate 282 is cut off when the clockwise motor drive signal CW is generated. This prevents simultaneous generation of the clockwise motor drive signal CW and the counter clockwise motor drive signal CCW.

A pair of switches enable the transmission to be shifted manually. Auto/Manual switch 144 switches between the signals generated by logic control unit 220 and jog switch 147. In normal use auto/manual switch 144 is in the auto position illustrated in FIG. 15 in which the clockwise motor control signal CW and the counter clockwise motor control signal CCW generated by logic control unit 220 are coupled to motor driver circuit 222. In this position logic control unit 220 controls motor driver circuit 222 in accordance with the principles of the present invention explained herein. When auto/manual switch 144 is in the manual position, signals from jog switch 147 are coupled to motor driver circuit 222.

This jog switch 147 is preferably a double pole double throw momentary contact switch with a center off position. Momentary of jog switch 147 in one direction causes generation of the counter-clockwise motor drive signal CW, in the same manner as generated by logic control unit 220. Similarly, momentary actuation of jog switch 147 in the opposite direction generates the counter-clockwise motor drive signal CCW. These signals are applied to motor driver circuit 122 in the manner similar to the signals received from logic control unit 220. Jog switch 147 thus permits the user of the motor vehicle to change the state of the automatic transmission in the event of some failure of the electrical control system.

Figure 19:
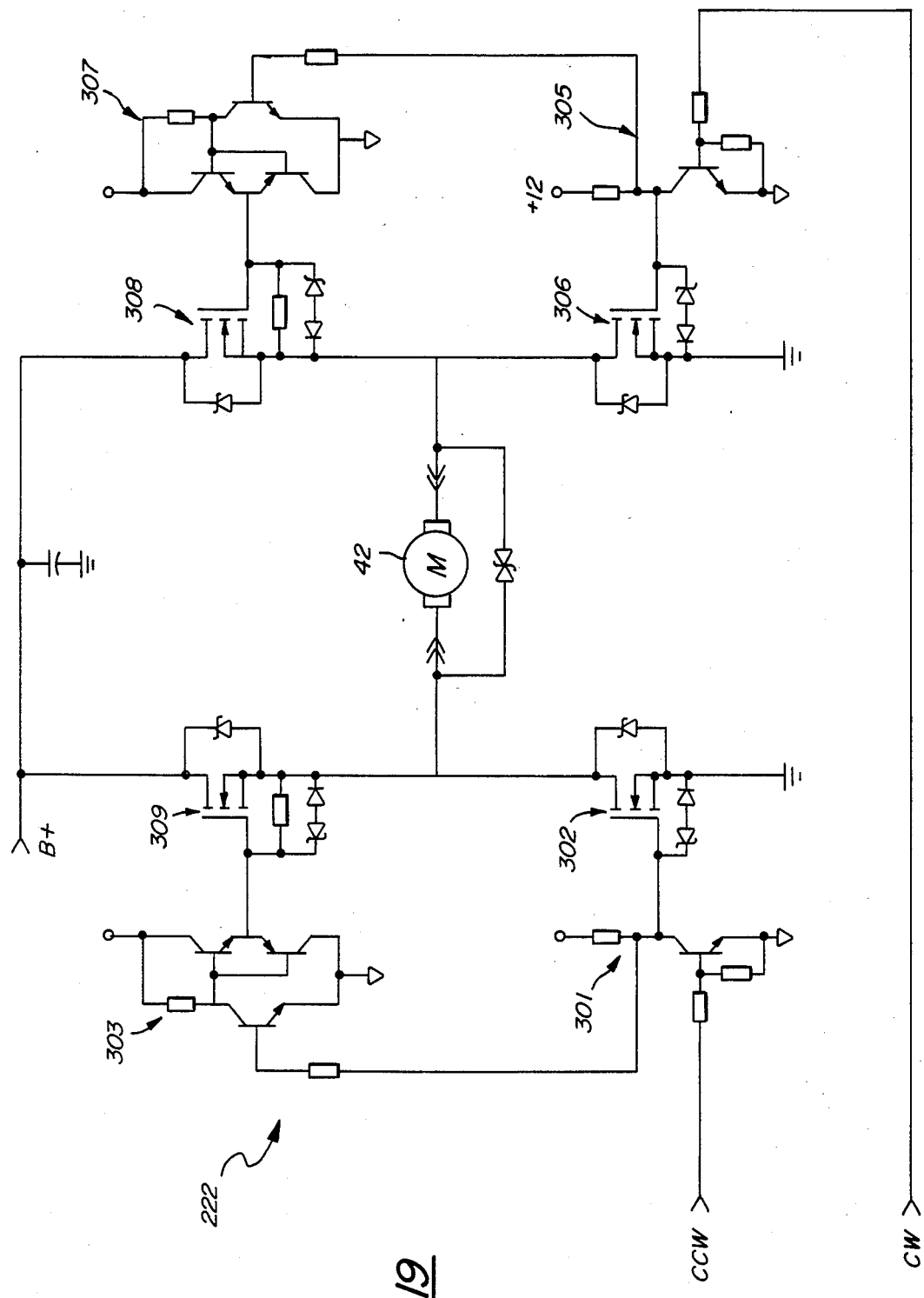
FIG. 19 is a schematic diagram of the motor drive circuit.

Motor driver circuit 222 is illustrated in detail in FIG. 19. The counter-clockwise motor drive signal CCW is applied to inverter 301. The output of inverter 301 is applied to switch 302 and to inverter 303. The output of buffer 303 is applied to switch 304. In a similar manner the clockwise motor control signal CW is applied to the input of inverter 305. The output of inverter 305 is applied to switch device 306. The output of inverter 305 is also applied to the input of inverter 307, which supplies the input to switch device 308.

Motor 42 is connected in an H bridge circuit between switch devices 302, 304, 306 and 308. Both clockwise motor drive signal CW and counter-clockwise motor drive signal CCW are normally inactive at a low voltage. Thus the output of inverter 301 is high and switch device 302 is conductive and switch device 304 is not conductive. Similarly, switch device 306 is normally conductive and switch device 308 is normally not conductive. Thus both terminals of motor 42 are connected to ground.

Upon receipt of an active counter-clockwise motor drive signal CCW inverter 301 switches states. Thus switch device 304 is turned on and switch device 302 is turned off. Because switch device 306 remains on, a current flows through motor 42 in a first direction through switch devices 304 and 306. When the desired shift position is reached, counter-clockwise motion drive signal CCW returns to the inactive low state. Thus switch device 302 is turned on and switch device 304 is turned off. Dynamic braking is achieved because both terminals of motor 42 are connected to ground (note switch device 306 has remained conductive during this sequence).

When clockwise motor drive signal CW is active, switch device 306 is turned off and switch device 308 is turned on. This causes a current to flow through motor 42 in the opposite direction through switch device 308 and switch device 302. Likewise when the clockwise motor drive signal CW ceases motor 42 is dynamically braked by both terminals being connected to ground.

Thus motor 42 is controlled to rotate clockwise or counter-clockwise in accordance with the signal supplied from logic control unit 220. Motor control circuit 222 illustrated in FIG. 19 also includes a feature for dynamically breaking motor 42 when neither the counter-clockwise motor control signal CCW nor the clockwise motor control signal CW is generated.

As soon as the instantaneous encoder signal transmitted by pick-up device 76 matches the signal generated by the specific depressed push button, logic control unit 220 of control module 10 functions to deenergize and brake the motor so that the mode select lever 22, and thereby the transmission, is stopped precisely in the selected shift position. If the lever 60 construction of FIG. 13 is employed, springs 64,65 coact with piston 60i to ensure that the internal detent controlled by lever 22 does not hang up on a crest of the known roostertail in the transmission but that, rather, the detent is moved to a precise shift position in which it is firmly seated in a notch or valley of the roostertail.

If at any time the operator desires to downshift the transmission as, for example, in a passing situation, the accelerator pedal 14 is fully depressed to close switch 138. A signal from the closed switch 138 is transmitted to logic control unit 220 by lead 126 where it is amplified by a buffer device 142 carried by printed circuit 104 and transmitted in amplified form through lead 92 to solenoid 36 which is thereby energized to retract the plunger of the solenoid and pivot downshift lever 24 in a counter-clockwise direction, as viewed in FIG. 9, to effect the desired downshifting of the transmission.

As previously described, the invention system would also preferably include illumination means for the push buttons 100 with the intensity of the illumination controlled by the usual dash dimmer and with the button corresponding to the present gear being illuminated brighter than the remaining buttons to provide a ready indication of the instantaneous position of the transmission. An override push button 143 is also provided as a part of push button submodule 30a. Override push button 143 allows the selection of any gear when it is necessary for the seat to be empty and the vehicle to be in a gear other than PARK, for example, during vehicle tune-up, vehicle car wash, et cetera.

Figure 12:
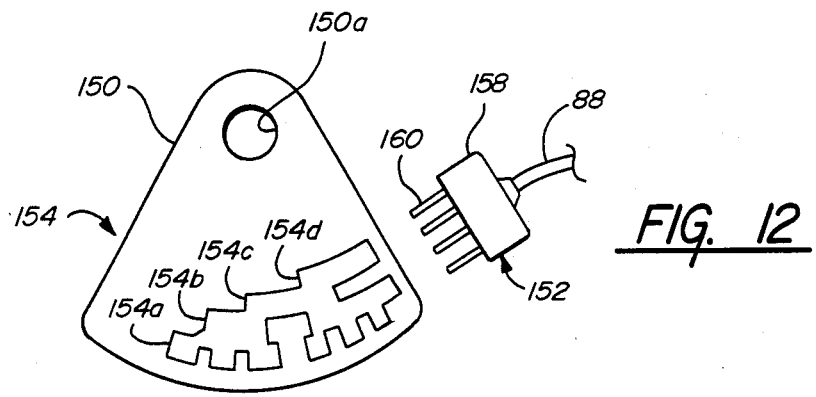

An alternate form of encoder assembly is shown in FIGS. 10–12. In this arrangement, the encoder assembly, rather than being provided within the sealed cavity 78 of the speed reduction unit 44, is provided as an independent unit 146 adapted to be fitted over the mode select lever 11 and to move with that lever so as to constantly sense the position of that lever and thereby sense the shift position of the transmission.

Encoder assembly 146 includes a housing 148, an encoder member 150, and a pick-up device 152.

Housing 148 may be formed of any suitable rigid material and includes an outer wall 148a, an inner wall 148b, flange portions 148c, an aperture 148d in outer wall 148a, an aperture 148e in inner wall 148b, and an arcuate slot 148f in inner wall 148b. In this embodiment, the central shaft 26 on which the kick-down lever 24 is mounted is extended to provide a shank portion 26a, shoulder portion 26b, and a threaded end portion 26c.

Encoder member 150 is arcuate and includes coded indicia 154 provided on tracks 154a, 154b, 154c and 154d generally corresponding to tracks 80a, 80b, 80c and 80d on encoder wheel 74. Pins 156 project from the face of encoder member 150 opposite the face on which indicia 154 is provided.

Pick-up device 152 includes a body portion 158 and resilient fingers 160 for coaction with the coded indicia on encoder member 150.

Encoder member 150 is positioned within the hollow interior 162 of housing 148 with pins 156 passing sealingly through arcuate slot 148f, and pick-up device 152 is positioned on the inner face of outer housing wall 148a with fingers 160 is coacting relation to the coded indicia on encoder member 150.

Encoder assembly 146 is fitted over shaft 26 with housing aperture 148e positioned on shank portion 26a, aperture 150a of encoder member 150 positioned on shank 26a, outer wall 148a positioned on shoulder 26b, and a nut 4 engaging threaded end portion 26c and seating against the annular shoulder between shaft portions 26b and 26c so as to preclude axial displacement of encoder assembly 146 relative to shaft 26 but allow rotation of the shaft relative to encoder assembly 146. Rotation of the encoder assembly is prevented by engagement of flange portions 148c with suitable portions on the transmission housing with kick down lever 24 disposed between spaced flanged portions 148c and pivotal in the space provided between the flange portions. Pins 156 snugly engage the opposite side edges of mode select lever 22 so that encoder member 150 moves positively and precisely in accordance with the movement of the mode select lever and so that the encoder signal picked up, generated and transmitted by pick-up device 152 from the coded indicia on encoder member 150 is always representative of the precise shift position of the transmission.

The invention electric control system for an automatic transmission apparatus will be seen to have many advantages. Specifically, the two modular assemblies minimize components and inventory requirements; the ease of assembly of the modules minimizes assembly plant labor; the power and control modules may both be pretested prior to delivery to the vehicle manufacturer with consequent improvements in reliability and warranty costs; noise and vibration from the power train to the passenger compartment is substantially minimized; the awkward and intruding gear select lever is eliminated in favor of attractive flush-mounted push buttons in the instrument panel of the vehicle; and several important safety and convenience features are provided such as automatic shifting to park when the ignition is shut off; automatic prohibition of shifts that would be inappropriate in view of the sensed vehicle speed and direction, and automatic movement of the transmission to park in the event that the driver opens the door and leaves the seat with the engine running and the transmission in a position other than park. The invention electric shift apparatus thus provides many comfort, convenience, and safety advantages as compared to existing transmission control systems and yet may be provided at a cost that is competitive with the existing systems and with projected maintenance and warranty costs less than the existing systems.

Whereas preferred embodiments of the invention have been illustrated and described in detail it will be apparent that various changes have been made in the disclosed embodiments not departing from the scope or spirit of the invention. It should be particularly noted that various of the electronic circuits, such as present gear encoder 210, desired gear encoder 214 and lamp decoder/driver 216, could be embodied in the same integrated circuit as logic control unit 220.

I claim:

1. An electrical control apparatus for control of an automatic transmission apparatus in a motor vehicle having a plurality of transmission states including a motor adapted for upshifts and downshifts, the electrical control apparatus comprising:
   an operator input means for generating a desired transmission state signal corresponding to manual operator input;
   a transmission state sensing means for generating a present transmission state signal indicative of the state of the automatic transmission;
   a speed sensing means for generating a signal indicative of the speed of the motor vehicle;
   a logic control unit connected to the motor, said operator input means and said transmission state sensing means
      for determining if said desired transmission state differs from said present transmission state signal, and
      for determining whether the desired transmission state is an upshift or a downshift from the present transmission state, and for controlling the motor to upshift if the desired transmission state is an upshift from the present transmission state and to downshift if the desired transmission state is a downshift from the present transmission state, when said desired transmission state signal differs from said present transmission state signal,
      for inhibiting control of the motor for either an upshift or a downshift when said signal indicative of the speed of the motor vehicle indicates a speed greater than a predetermined speed corresponding to the desired transmission state, at least two transmission states having corresponding predetermined speeds which differ.

2. The electrical control apparatus as claimed in claim 1 wherein the automatic transmission apparatus includes the transmission state of park and further comprising:
   an ignition sensing means for determining when the motor vehicle is switched on; and
   said logic control unit includes a park shift means for controlling the motor to shift to the transmission state of park if said ignition sensing means determines the motor vehicle is not switched on.

3. The electrical control apparatus according to claim 2 wherein:
   the transmission state of park comprises the furthest upshift transmission state; and
   the park shift means is operative to control the motor to upshift to the transmission state of park if said ignition sensing means determines the motor vehicle is not switched on.

4. The electrical control apparatus as claimed in claim 1 wherein the motor vehicle includes a brake pedal for actuation of a motor vehicle system and the automatic transmission apparatus includes the transmission state of park and wherein:
   said apparatus further includes a brake sensing means for generating a brake depression signal when the brake pedal is depressed; and
   said shift inhibition means inhibits control of the motor for shifting when said present transmission state signal indicates the automatic transmission is in the transmission state of park and said brake depressed signal is not received.

5. The electrical control apparatus according to claim 4 wherein:
the transmission state of park comprises the furthest upshift transmission state; and
the park shift means is operative to control the motor to upshift to the transmission state of park if said ignition sensing means determines the motor vehicle is not switched on.

6. The electrical control apparatus as claimed in claim 1, further comprising:
a brake sensing means for generating a brake depress signal when the brake is depressed; and
said logic control means further includes means for inhibiting control of the motor for either an upshift or a downshift when said present transmission state signal indicates one of a predetermined set of at least one transmission state, and said brake signal depress signal is not received.

7. The electrical control apparatus as claimed in claim 1, further comprising:
an indicator means connected to said transmission state sensing means for generating an operator perceivable indication of said transmission state signal.

8. An electrical control apparatus for control of an automatic transmission apparatus in a motor vehicle having a plurality of transmission states including a motor adapted for clockwise and counter-clockwise motion for control of the transmission state, the electrical control apparatus comprising:
an operator input means for generating a desired transmission state signal corresponding to manual operator input;
a transmission state sensing means for generating a present transmission state signal indicative of the state of the automatic transmission; and
a speed sensing means for generating at least one vehicle speed signal indicative of the speed of the motor vehicle;
a logic control unit connected to said operator input means and said transmission state sensing means for determining if said desired transmission state differs from said present transmission state signal, and
for determining whether the desired transmission state is clockwise or counter-clockwise of the present transmission state, and for generating a clockwise motor drive signal if the desired transmission state is clockwise from the present transmission state and a counter-clockwise motor drive signal if the desired transmission state is counter-clockwise of the present transmission state, when said desired transmission state signal differs from said present transmission state signal,
said logic control unit including a shift inhibition means for inhibiting control of the motor for either clockwise motion or counter-clockwise motion when said at least one vehicle speed signal indicates a motor vehicle speed greater than a predetermined motor vehicle speed corresponding to said desired transmission state, at least two transmission states having corresponding predetermined speeds which differ; and
a motor drive means connected to said logic control unit and adapted for connection to the motor for controlling the motor for clockwise motion in response to said clockwise motor drive signal and for counter-clockwise motion in response to said counter-clockwise motor drive signal.

9. The electrical control apparatus as claimed in claim 8 wherein the automatic transmission apparatus includes the transmission state of park and further comprising:
an ignition sensing means for determining when the motor vehicle is switched on; and
said logic control unit includes a park shift means for generating a motor drive signal until said present transmission state signal indicates the transmission state of park if said ignition sensing means determines the motor vehicle is not switched on.

10. The electrical control apparatus according to claim 9 wherein:
the transmission state of park is the furthest counter-clockwise transmission state; and
the park shift means generates a counter-clockwise motor control signal until said present transmission state signal indicates the transmission state of park if said ignition sensing means determines the motor vehicle is not switched on.

11. The electric control apparatus as claimed in claim 8 wherein the motor vehicle includes a brake pedal for actuation of a motor vehicle brake system and the automatic transmission apparatus includes the transmission state of park and wherein:
said apparatus further includes a brake sensing means for generating a brake depress signal when the brake pedal is depressed; and
said shift inhibit means inhibits generation of a motor control signal when said present transmission state signal indicates the automatic transmission is in the transmission state of park and said brake depress signal is not received.

12. The electrical control apparatus according to claim 11 wherein:
the transmission state of park is the furthest counter-clockwise transmission state; and
the park shift means generates a counter-clockwise motor control signal until said present transmission state signal indicates the transmission state of park if said ignition sensing means determines the motor vehicle is not switched on.

13. An electrical control apparatus for control of an automatic transmission apparatus as claimed in claim 8, further comprising:
an indicator means connected to said transmission state sensing means for generating an operator perceivable indication of said transmission state signal.

14. An electrical control apparatus for control of an automatic transmission apparatus as claimed in claim 8 wherein:
said apparatus further includes a brake sensing means for generating a brake depress signal when the brake is depressed; and
said logic control means further includes means for inhibiting generation of either said clockwise motor control signal or said counter-clockwise motor control signal when said present transmission state signal indicates one of a predetermined set of at least one transmission state, and said brake signal depress signal is not received.

15. Electrical control apparatus for control of an automatic transmission apparatus in a motor vehicle having an operator's door, an operator's seat, and a plurality of transmission states including the transmission state of park, including electrical power means for change of the transmission state, said electrical control apparatus comprising:

an operator input means for generating a desired transmission state signal corresponding to manual operator input;

a transmission state sensing means for generating a present transmission state signal indicative of the state of the automatic transmission apparatus;

an ignition sensing means of determining when the motor vehicle is switched on;

a door sensing means for generating a door signal indicating the operator's door of the motor vehicle is closed;

a seating sensing means for generating a seat signal indicating the operator's seat is occupied; and a logic control unit connected to the electric power means, said operator input means and said transmission state sensing means, said door sensing means, said seat sensing means and said ignition sensing means for determining if said desired transmission state differs from said present transmission state signal, for controlling the electric power means to shift the transmission to the transmission state as indicated by said desired transmission state if said desired transmission state signal differs from said present transmission state signal, for controlling the electric power means to shift the transmission to the transmission tate of park if said ignition sensing means determines the motor vehicle is not switched on, said door signal is not received and said seat signal is not received.

16. An electrical control apparatus for control of an automatic transmission apparatus in a motor vehicle having a plurality of transmission states including a motor adapted for upshifts and downshifts, the electrical control apparatus comprising:

an operator input means for generating a desired transmission state signal corresponding to manual operator input;

a transmission state sensing means for generating a present transmission state signal indicative of the state of the automatic transmission; and a logic control unit connected to the motor, said operator input means and said transmission state sensing means for determining if said desired transmission state differs from said present transmission state signal, and for determining whether the desired transmission state is an upshift or a downshift from the present transmission state, and for controlling the motor to upshift if the desired transmission state is an upshift from the present transmission state and to downshift if the desired transmission state is a downshift from the present transmission state, when said desired transmission state signal differs from said present transmission state signal, said logic control unit including a motor drive circuit for applying electric power to the motor in a first polarity for control of an upshift and in a second opposite polarity for control of a downshift; said motor drive circuit including:

a first switch device connected between a first dc voltage source and a first terminal of the motor, a second switch device connected between a second dc voltage source having a differing voltage than said first dc voltage source and the first terminal of the motor, a third switch device connected between said first dc voltage source and a second terminal of the motor, a fourth switch device connected between the second terminal of the motor and said second dc voltage source, and a control means connected to said first, second, third and fourth switch device for causing said first and fourth switch devices to be conductive thereby applying dc power to the motor in a first polarity for control of an upshift, for causing said second and third switch devices to be conductive thereby applying dc power to the motor in a second opposite polarity for control of a downshift, and for causing said second and fourth switch devices to be conductive for dynamically breaking the motor when neither an upshift nor a downshift is desired.

17. An electrical control apparatus for control of an automatic transmission apparatus in a motor vehicle having a plurality of transmission states including a motor adapted for upshifts and downshifts, the motor having an angular range for each transmission state and an exact center for each transmission state, the electrical control apparatus comprising:

an operator input means for generating a desired transmission state signal corresponding to manual operator input;

transmission state sensing means for generating a present transmission state signal indicative of the state of the automatic transmission including a shaft encoder connected to sense the rotary position of the motor, said shaft encoder generating a plurality of signals indicating when the rotary position of the motor is in the angular range of the corresponding transmission state and a further signal indicating when the rotary position of the motor is in the exact center of the corresponding transmission state; and a logic control unit connected to the motor, said operator input means and said transmission state sensing means for determining if said desired transmission state differs from said present transmission system signal, and for determining whether the desired transmission state is an upshift or a downshift from the present transmission state, for controlling the motor to upshift if the desired transmission state is an upshift from the present transmission state and to downshift if the desired transmission state is a downshift from the present transmission state, when said desired transmission state signal differs from said present transmission state signal, and for stopping the motor when said plurality of signals of said shaft encoder indicates said angular range of said desired transmission state and said further signal of said shaft encoder indicates the exact center of said desired transmission state.

18. An electrical control apparatus for control of an automatic transmission apparatus in a motor vehicle having a plurality of transmission states including a motor adapted for clockwise and counter-clockwise motion for control of the transmission state, the electrical control apparatus comprising:

an operator input means for generating a desired transmission state signal corresponding to manual operator input;

a transmission state sensing means for generating a present transmission state signal indicative of the state of the automatic transmission;

a logic control unit connected to said operator input means and said transmission state sensing means for determining if said desired transmission state differs from said present transmission state signal, and for determining whether the desired transmission state is clockwise or counter-clockwise to the present transmission state, and for generating a clockwise motor drive signal if the desired transmission state is clockwise from the present transmission state and a counter-clockwise motor drive signal if the desired transmission state is counter-clockwise of the present transmission state, when said desired transmission state signal differs from said present transmission state signal;

a motor drive means connected to said logic control unit and adapted for connection to the motor for controlling the motor for clockwise motion in response to said clockwise motor drive signal and for counter-clockwise motion in response to said counter-clockwise motor drive signal; and a vehicle condition sensing means for generating a plurality of vehicle condition signals, each vehicle condition signal corresponding to an operational condition of the motor vehicle;

said logical control unit including a shift inhibition means for inhibiting a generation of either said clockwise motor control signal or said counter-clockwise motor control signal when said desired transmission state signal and said vehicle condition signals correspond to one of a set of unsafe circumstances;

said vehicle condition means including a speed sensing means for generating at least one vehicle speed signal indicative of the speed of the motor vehicle;

said shift inhibition means inhibiting the generation of either said clockwise motor control signal or said counter-clockwise motor control signal when said at least one vehicle speed signal indicates a motor vehicle speed greater than a predetermined motor vehicle speed corresponding to said desired transmission state signal;

said automatic transmission apparatus including the transmission states of park, reverse, low1 and low2;

said speed sensing means generates a first vehicle speed signal when the speed of the motor vehicle exceeds a first predetermined speed, a second speed signal when the speed of the motor vehicle exceeds a second predetermined speed greater than said first predetermined speed, a third speed signal when the speed of the motor vehicle exceeds a third predetermined speed greater than said second predetermined speed, and a fourth speed signal when the speed of the motor vehicle exceeds a fourth predetermined speed greater than said third predetermined speed;

said shift inhibition means inhibits the generation of either said clockwise motor control signal or said counter-clockwise motor control signal when said first vehicle speed signal is received and said desired transmission state signal corresponds to the park transmission state, said second vehicle speed signal is received and said desired transmission state signal corresponds to the reverse transmission state, said third vehicle speed signal is received and said desired transmission state signal corresponds to the low1 transmission state, and said fourth vehicle speed signal is received and said desired transmission state signal correspons to the low2 transmission state.

19. The electrical control apparatus for control of an automatic transmission apparatus as claimed in claim 18, wherein:

said first predetermined speed is approximately 3 miles per hour;

said second predetermined speed is approximately 7 mils per hour;

said third predetermined speed is approximately 20 miles per hour; and said fourth predetermined speed is approximately 30 miles per hour.

20. The electrical control apparatus for control of an automatic transmission apparatus as claimed in claim 18, wherein:

said speed sensing receives a analog speed signal indicative of motor vehicle speed and includes a first comparator for generating said first vehicle speed signal when said analog speed signal exceeds a first threshold level, a second comparator for generating said second speed signal when said analog speed signal exceeds a second threshold level, higher than said first threshold level, a third comparator for generating said third speed signal when said analog speed signal exceeds a third threshold level, higher than said second threshold level, and a fourth comparator for generating said fourth speed signal when said analog speed signal exceeds a fourth threshold level, higher than said third threshold level.

21. An electrical control apparatus for control of an automatic transmission apparatus in a motor vehicle having a plurality of transmission states including a motor adapted for clockwise and counter-clockwise motion for control of the transmission state, the electrical control apparatus comprising:

an operator input means for generating a desired transmission state signal corresponding to manual operator input;

a transmission state sensing means for generating a present transmission state signal indicative of the state of the automatic transmission;

a logic control unit connected to said operator input means and said transmission state sensing means for determining if said desired transmission state differs from said present transmission state signal, and for determining whether the desired transmission state is clockwise or counter-clockwise of the present transmission state, and for generating a clockwise motor drive signal if the desired transmission state is clockwise from the present transmission state and a counter-clockwise motor drive signal if the desired transmission state is counter-clockwise of the present transmission state, when said desired transmission state signal differs from said present transmission state signal;
a motor drive means connected to said logic control unit and adapted for connection to the motor for controlling the motor for clockwise motion in response to said clockwise motor drive signal and for counter-clockwise motion in response to said counter-clockwise motor drive signal; and
the vehicle condition sensing means for generating a plurality of vehicle condition signals each vehicle condition signal corresponding to an operational condition of the motor vehicle;
said logic control unit including a shift inhibition means for inhibiting the generation of either said clockwise motor control signal or said counter-clockwise motor control signal when said desired transmission state signal and said vehicle condition signals correspond to one of a set of unsafe circumstances;
said vehicle condition sensing means including ignition sensing means for determing when the motor vehicle is switched on and a drive seat sensor when the driver seat is occupied; and
said shift inhibition means of said logic control unit inhibiting the generation of either said clockwise motor control signal or said counter-clockwise motor control signal when the motor vehicle is switched on and the driver's seat is not occupied.

22. The electrical control apparatus for control of an automatic transmission apparatus as claimed in claim 21, wherein the automatic transmission includes the transmission state of neutral, and wherein:
said operator input means further includes means for generating an override state signal;
said shift inhibition means of said logic control unit permits the generation of either said clockwise motor control signal or said counter-clockwise motor control signal upon receipt of said override signal for changing the transmission state regardless of whether the ignition is on and whether the driver's seat is not occupied.

23. An electrical control apparatus for control of an automatic transmission apparatus in a motor vehicle having a plurality of transmission states including a motor adapted for clockwise and counter-clockwise motion for control of the transmission state, the electrical control apparatus comprising:
an operator input means for generating a desired transmission state signal corresponding to manual operator input;
a transmission state sensing means for generating a present transmission state signal indicative of the state of the automatic transmission;
a logic control unit connected to said operator input means and said transmission state sensing means for determining if said desired transmission state differs from said present transmission state signal, and
for determining whether the desired transmission state is clockwise or counter-clockwise of the present transmission state, and for generating a clockwise motor drive signal if the desired transmission state is clockwise from the present transmission state and a counter-clockwise motor drive signal if the desired transmission state is counter-clockwise of the present transmission state, when said desired transmission state signal differs from said present transmission state signal;

a motor drive means connected to said logic control unit and adapted for connection to the motor for controlling the motor for clockwise motion in response to said clockwise motor drive signal and for counter-clockwise motion in response to said counter-clockwise motor drive signal; and
a vehicle condition sensing means for generating a plurality of vehicle condition signals, each vehicle condition signal corresponding to an operational condition of the motor vehicle;
said logic control unit including a shift inhibition means for inhibiting the generation of either said clockwise motor control signal or said counter-clockwise motor control signal when said desired transmission state signal and said vehicle condition signals correspond to one of a set of unsafe conditions;
said automatic transmission including the transmission state of park;
said vehicle condition sensing means including ignition sensing means for determining when the motor vehicle is switched on, a driver's door sensor for determining when the driver's door is open and a driver's seat sensor for detecting when the driver's seat is occupied; and
said logic control unit further including park shift means for generation of one of either said clockwise motor control signal or said counter-clockwise motor control signal for changing the transmission state to park when the motor vehicle is switched on the driver's door is open and the driver's seat is not occupied.

24. An electrical control apparatus for control of an automatic transmission apparatus in a motor vehicle having a plurality of transmission states including a motor adapted for clockwise and counter-clockwise motion for control of the transmission state, the electrical control apparatus comprising:
an operator input means for generating a desired transmission state signal corresponding to manual operator input;
a transmission state sensing means for generating a present transmission state signal indicative of the state of the automatic transmission;
a logic control unit connected to said operator input means and said transmission state sensing means for determining if said desired transmission state differs from said present transmission state signal, and
for determining whether the desired transmission state is clockwise or counter-clockwise of the present transmission state, and for generating a clockwise motor drive signal if the desired transmission state is clockwise from the present transmission state and a counter-clockwise motor drive signal if the desired transmission state is counter-clockwise of the present transmission state, when said desired transmission state signal differs from said present transmission state signal; and
a motor drive means connected to said logic control unit and adapted for connection to the motor for controlling the motor for clockwise motion in response to said clockwise motor drive signal and for counter-clockwise motion in response to said counter-clockwise motor drive signal;
said logic control unit including a timer means for inhibiting the generation of either said clockwise motor control signal or said counter-clockwise motor control signal if said desired transmission state signal differs from said present transmission state signal for more than a predetermined period of time.

25. An electrical control apparatus for control of an automatic transmission apparatus in a motor vehicle having a plurality of transmission states including a motor adapted for clockwise and counter-clockwise motion for control of the transmission state, the electrical control apparatus comprising:
   an operator input means for generating a desired transmission state signal corresponding to manual operator input;
   a transmission state sensing means for generating a present transmission state signal indicative of the state of the automatic transmission;
   a logic control unit connected to said operator input means and said transmission state sensing means for determining if said desired transmission state differs from said present transmission state signal, and
      for determining whether the desired transmission state is clockwise or counter-clockwise of the present transmission state, and for generating a clockwise motor drive signal if the desired transmission state is clockwise from the present transmission state and a counter-clockwise motor drive signal if the desired transmission state is counter-clockwise of the present transmission state, when said desired transmission state signal differs from said present transmission state signal; and
   a motor drive means connected to said logic control unit and adapted for connection to the motor for controlling the motor for clockwise motion in response to said clockwise motor drive signal and for counter-clockwise motion in response to said counter-clockwise motor drive signal;
      said motor driving means applying dc electric power to the motor in a first polarity in response to said clockwise motor control signal, applying dc electric power to the motor in a second polarity opposite to said first polarity in response to said counter-clockwise motor control signal, and dynamically breaking the motor when neither said clockwise motor control signal nor said counter-clockwise motor control signal is received.

26. The electrical control apparatus for control of an automatic transmission apparatus as claimed in claim 25, wherein said motor drive means includes:
   a first switch device connected between a first DC voltage source and a first terminal of the motor;
   a second switch device connected between a second DC voltage source of a differing voltage than said first DC voltage source and the first terminal of the motor;
   a third switch device connected between said first DC voltage source and a second terminal of the motor;
   a fourth switch device connected between said second DC voltage source and the second terminal of the motor; and
   a control means connected to the first, second, third and fourth switch means for causing said first and fourth switch devices to be conductive upon receipt of said clockwise motor drive signal, for causing said second and third switch devices to be conductive upon receipt of said counter-clockwise motor drive signal and for causing said second and fourth switch devices to be conductive upon receipt of neither said clockwise motor drive signal nor said counter-clockwise motor control signal.

27. An electrical control apparatus for control of an automatic transmission apparatus in a motor vehicle having a plurality of transmission states including a motor adapted for clockwise and counter-clockwise motion for control of the transmission state, the electrical control apparatus comprising:
   an operator input means for generating a desired transmission state signal corresponding to manual operator input;
   a transmission state sensing means for generating a present transmission state signal indicative of the state of the automatic transmission;
   a logic control unit connected to said operator input means and said transmission state sensing means for determining if said desired transmission state differs from said present transmission state signal, and
      for determining whether the desired transmission state is clockwise or counter-clockwise of the present transmission state, and for generating a clockwise motor drive signal if the desired transmission state is clockwise from the present transmission state and a counter-clockwise motor drive signal if the desired transmission state is counter-clockwise of the present transmission state, when said desired transmission state signal differs from said present transmission state signal; and
   a motor drive means connected to said logic control unit and adapted for connection to the motor for controlling the motor for clockwise motion in response to said clockwise motor drive signal and for counter-clockwise motion in response to said counter-clockwise motor drive signal;
      said operator input means including a plurality of manual push-button switches whereby manual actuation of one of said push-button switches causes generation of the corresponding desired transmission state signal,
      said electrical control apparatus further including an indicator means connected to said transmission state sensing means including a plurality of transmission state indicators, each disposed adjacent to a corresponding push-button switch, said indicator means for actuation of one of said transmission state indicators corresponding to said transmission state signal.

28. An electrical control apparatus for control of an automatic transmission apparatus as claimed in claim 27, wherein the motor vehicle includes a variable illumination supply voltage for control of instrument illumination intensity and:
   each of said transmission state indicators is connected to the variable illumination supply voltage for providing an illumination intensity corresponding to the magnitude of the variable illumination supply voltage.

29. An electrical control apparatus for control of an automatic transmission apparatus in a motor vehicle having a plurality of transmission states including a motor adapted for clockwise and counter-clockwise motion for control of the transmission state, the electrical control apparatus comprising:

an operator input means for generating a desired transmission state signal corresponding to manual operator input;

a transmission state sensing means for generating a present transmission state signal indicative of the state of the automatic transmission;

a logic control unit connected to said operator input means and said transmission state sensing means for determining if said desired transmission state differs from said present transmission state signal, and for determining whether the desired transmission state is clockwise or counter-clockwise of the present transmission state, and for generating a clockwise motor drive signal if the desired transmission state is clockwise from the present transmission state and a counter-clockwise motor drive signal if the desired transmission state is counter-clockwise of the present transmission state, when said desired transmission state signal differs from said present transmission state signal;

a motor drive means connected to said logic control unit and adapted for connection to the motor for controlling the motor for clockwise motion in response to said clockwise motor drive signal and for counter-clockwise motion in response to said counter-clockwise motor drive signal; and a manual control means connected to said motor drive means for selective generation of said clockwise motor control signal and said counter-clockwise motor control signal in response to manual inputs.

30. An electrical control apparatus for control of an automatic transmission apparatus as claimed in claim 29, wherein said manual control means includes:

a first momentary contact switch for generation of said clockwise motor control signal;

a second momentary contact switch for generation of said counter-clockwise motor control signal; and an auto/manual switch connected to said logic control unit, said motor drive means and said first and second momentary contact switches for alternately connecting said clockwise motor control signal and said counter-clockwise motor control signal generated by said logic control unit of said first and second momentary contact switches to said motor drive means.

31. An electrical control apparatus for control of an automatic transmission apparatus in a motor vehicle having a plurality of transmission states including a motor adapted for clockwise and counter-clockwise motion for control of the transmission state, the electrical control apparatus comprising:

an operator input means for generating a desired transmission state signal corresponding to manual operator input;

a transmission state sensing means for generating a present transmission state signal indicative of the state of the automatic transmission;

a logic control unit connected to said operator input means and said transmission state sensing means for determining if said desired transmission state differs from said present transmission state signal, and for determining whether the desired transmission state is clockwise or counter-clockwise of the present transmission state, and for generating a clockwise motor drive signal if the desired transmission state is clockwise from the present transmission state and a counter-clockwise motor drive signal if the desired transmission state is counter-clockwise of the present transmission state, when said desired transmission state signal differs from said present transmission state signal;

a motor drive means connected to said logic control unit and adapted for connection to the motor for controlling the motor for clockwise motion in response to said clockwise motor drive signal and for counter-clockwise motion in response to said counter-clockwise motor drive signal; and the motor vehicle including an accelerator pedal, the automatic transmission including a down shift lever connected to a down shift solenoid for temporarily downshifting, said electrical control apparatus further comprising an accelerator pedal switch connected to the accelerator pedal for generating an accelerator depression signal upon full depression of the accelerator pedal, said logic control unit further including a down shift control means for generating a solenoid control signal for application to the solenoid upon receipt of said accelerator depression signal.

32. An electrical control apparatus for control of an automatic transmission apparatus in a motor vehicle having a plurality of transmission states including a motor adapted for clockwise and counter-clockwise motion for control of the transmission state, the motor having an angular range for each transmission state and an exact center for each transmission state, the electrical control apparatus comprising:

an operator input means for generating a desired transmission state signal corresponding to manual operator input;

a transmission state sensing means for generating a present transmission state signal indicative of the state of the automatic transmission including a shaft encoder connected to sense the rotary position of the motor, said shaft encoder generates a plurality of signals indicating when the rotary position of the motor is in the angular range of the corresponding transmission state and a further signal indicating when the rotary position of the motor is in the exact center of the corresponding transmission state; and a logic control unit connected to said operator input means and said transmission state sensing means for determining if said desired transmission state signal differs from said present transmission state signal, and for determining whether the desired transmission state is clockwise or counter-clockwise of the present transmission state, and generating a clockwise motor drive signal if the desired transmission state is clockwise of the present transmission state and to generate a counter-clockwise motor drive signal if the desired transmission state is counter-clockwise of the present transmission state, when said desired transmission state signal differs from said present transmission state signal, and said logic control unit stops the motor when said plurality of signals of said shaft encoder indicates said angular range of said desired transmission state and said further signal of said shaft encoder indicates the exact center of said desired transmission state.

33. An electrical control apparatus for control of an automatic transmission apparatus in a motor vehicle having a plurality of transmission states including a motor adapted for upshifts and downshifts, the electrical control apparatus comprising:

an operator input means for generating a desired transmission state signal corresponding to manual operator input;

a transmission state sensing means for generating a present transmission state signal indicative of the state of the automatic transmission;

an indicator means connected to said transmission state sensing means for generating an operator perceivable indication of said transmission state signal; and a logic control unit connected to the motor, said operator input means and said transmission state sensing means for determining if the desired transmission state differs from the present transmission state signal, for determining whether the desired transmission state is an upshift or a downshift from the present transmission state, and for controlling the motor to upshift if the desired transmission state is an upshift from the present transmission state and to downshift if the desired transmission state is a downshift from the present transmission state, when the desired transmission state signal differs from the present transmission state signal.

34. An electrical control apparatus for control of an automatic transmission apparatus in a motor vehicle having a plurality of transmission states including a motor adapted for clockwise and counter-clockwise motion for control of the transmission state, the electrical control apparatus comprising:

an operator input means for generating a desired transmission state signal corresponding to manual operator input;

a transmission state sensing means for generating a present transmission state signal indicative of the state of the automatic transmission;

an indicator means connected to said transmission state sensing means for generating an operator perceivable indication of said transmission state signal; and a logic control unit connected to said operator input means and said transmission state sensing means for determining if the desired transmission state differs from the present transmission state signal, for determining whether the desired transmission state is clockwise or counter-clockwise of the present transmission state, and for generating a clockwise motor drive signal if the desired transmission state is clockwise from the present transmission state and a counter-clockwise motor drive signal if the desired transmission state is counterclockwise from the present transmission state; and a motor drive means connected to said logic control unit and adapted for connection to the motor for controlling the motor for clockwise motion in response to said clockwise motor drive signal and for counter-clockwise motion in response to said counter-clockwise motor drive signal.

35. An electrical control apparatus for control of an automatic transmission apparatus in a motor vehicle having a plurality of transmission states including a motor adapted for upshifts and downshifts, the electrical control apparatus comprising:

an operator input means for generating a desired transmission state signal corresponding to manual operator input;

a transmission state sensing means for generating a present transmission state signal indicative of the state of the automatic transmission;

a brake sensing means for generating a brake depress signal when the brake is depressed; and a logic control unit connected to the motor, said operator input means, and said transmission state sensing means for determining if said desired transmission state differs from said present transmission state signal, for determining whether the desired transmission state is an upshift or a downshift from the present transmission state, for controlling the motor to upshift if the desired transmission state is an upshift from the present transmission state and to downshift if the desired transmission state is a downshift from the present transmission state, when said desired transmission state signal differs from said present transmission state signal, and for inhibiting control of the motor for either an upshift or a downshift when said present transmission state signal indicates one of a predetermined set of at least one transmission state, and said brake signal depress signal is not received.

36. An electrical control apparatus for control of an automatic transmission apparatus in a motor vehicle having a plurality of transmission states including a motor adapted for clockwise and counter-clockwise motion for control of the transmission state, the electrical control apparatus comprising:

an operator input means for generating a desired transmission state signal corresponding to manual operator input;

a transmission state sensing means for generating a present transmission state signal indicative of the state of the automatic transmission;

a brake sensing means for generating a brake depress signal when the brake is depressed; and a logic control unit connected to said operator input means and said transmission state sensing means for determining if said desired transmission state differs from said present transmission state signal, for determining whether the desired transmission state is clockwise or counter-clockwise of the present transmission state, for generating a clockwise motor drive signal if the desired transmission state is clockwise from the present transmission state and a counter-clockwise motor drive signal if the desired signal differs from said present transmission state signal, and for inhibiting generation of either said clockwise motor control signal or said counter-clockwise motor control signal when said present transmission state signal indicates one of a predetermined set of at least one transmission state, and said brake signal depress signal is not received; and a motor drive means connected to said logic control unit and adapted for connection to the motor for controlling the motor for clockwise motion in response to said clockwise motor drive signal and for counter-clockwise motion in response to said counter-clockwise motor drive signal.

37. An electric shift apparatus for use with a motor vehicle having an automatic transmission of the type including a mode select member to selectively shift a transmission between a plurality of shift positions, said apparatus comprising:

a power module adapted to be mounted on the housing of the transmission proximate the mode select member and including an electric motor assembly having an output shaft adapted to be drivingly connected to the mode select member;

a control module adapted to be mounted in the passenger compartment of a vehicle and including a plurality of mode select members, accessible to the vehicle operator and corresponding respectively to the transmission shift positions, and generator means operative in response to operator actuation of each mode select member to generate and operate a signal representative of the selected shift position;

comparator means receiving said operator signals and encoder signals representative of the present shift position, operative in response to receipt of an operator signal differing from the received encoder signal to energize said motor assembly in a sense to move the transmission to a desired shift position corresponding to the operator signal, and operative in response to arrival of the transmission in the desired position to deenergize said motor assembly;

means operative to generate a plurality of differing vehicle threshold speed signals corresponding respectively to a plurality of transmission shift positions; and means inhibiting energization of said motor assembly in a sense to move the transmission to a desired shift position when the vehicle threshold speed signal corresponding to the desired shift position is exceeded.

38. Electrical control apparatus for control of an automatic transmission apparatus in a motor vehicle having a plurality of transmission states including the transmission state of park, including electric power means adapted for change of the transmission state, said electrical control apparatus comprising:

an operator input means for generating a desired transmission state signal corresponding to manual operator input;

a transmission state sensing means for generating a present transmission state signal indicative of the state of the automatic transmission apparatus;

a speed sensor means for indicating if the speed of the motor vehicle is less than a predetermined nonzero speed;

an ignition sensing means for determining when the motor vehicle is switched on; and a logic control unit connected to the electric power means, said operator input means, said transmission state sensing means, said speed sensor means, and said ignition sensing means for determining if said desired transmission state signal differs from said present transmission state signal, for controlling the electric power means to shift the transmission to the transmission state as indicated by said desired transmission state signal if said desired transmission state signal differs from said present transmission state signal, and for controlling the electric power means to shift the transmission to the transmission state of park if said ignition sensing means determines the motor vehicle is not switched on and said speed sensor means indicates the speed of the motor vehicle is less than said predetermined nonzero speed.

39. The electrical control apparatus for control of an automatic transmission as claimed in claim 38, wherein:

said speed sensor means indicates when the speed of the motor vehicle is less than said predetermined nonzero amount in either the forward or reverse direction of movement of the motor vehicle.

40. Electrical control apparatus for control of an automatic transmission apparatus in a motor vehicle having a plurality of transmission states including the transmission state of park, including electrical power means for change of the transmission state, said electrical control apparatus comprising:

an operator input means for generating a desired transmission state signal corresponding to manual operator input;

a transmission state sensing means for generating a present transmission state signal indicative of the state of the automatic transmission apparatus;

an indicator means connected to said transmission state sensing means for generating an operator perceivable indication of said present transmission state signal;

an ignition sensing means for determining when the motor vehicle is switched on; and a logic control unit connected to the electric power means, said operator input means, said transmission state sensing means, and said ignition sensing means for determining if said desired transmission state differs from said present transmission state signal, for controlling the electric power means to shift the transmission to the transmission state as indicated by said desired transmission state if said desired transmission state signal differs from said present transmission state signal, and for controlling the electric power means to shift the transmission to the transmission state of park if said ignition sensing means determines the motor vehicle is not switched on, whereby said indicator means generates said operator perceivable indication when the transmission reaches the transmission state of park.

41. An electrical control apparatus for control of an automatic transmission apparatus as claimed in claim 40, wherein:

said operator input means includes a plurality of manual push button switches, whereby manual actuation of one of said push button switches causes generation of a corresponding desired transmission state signal; and said indicator means includes a park transmission state indicator actuated when said transmission state sensing means indicates the transmission state of park.

42. An electrical control apparatus for control of an automatic transmission apparatus in a motor vehicle having a plurality of transmission states including a motor adapted for changing the transmission state, the electrical control apparatus comprising:

an operator input means for generating a desired transmission state signal corresponding to manual operator input;

a transmission state sensing means for generating a present transmission state signal indicative of the state of the automatic transmission;

an indicator means connected to said transmission state sensing means for generating an operator perceivable indication of said present transmission state signal; and a logic control unit connected to the motor, said operator input means, and said transmission state sensing means for determining if said desired transmission state signal differs from said present transmission state signal, and for controlling the motor to change the transmission state to the desired transmission state when said desired transmission state signal differs from said present transmission state signal, whereby said indicator means generates said operator perceivable indication when said present transmission state reaches said desired transmission state.

43. Electrical control apparatus for control of an automatic transmission apparatus in a motor vehicle having a plurality of transmission states including the transmission state of park, including electrical power means for change of the transmission state, said electrical control apparatus comprising:

an operator input means for generating a desired transmission state signal corresponding to manual operator input;

a transmission state sensing means for generating a present transmission state signal indicative of the state of the automatic transmission apparatus;

an ignition sensing means for generating an ignition on signal when the motor vehicle is switched on; and a logic control unit connected to the electric power means, said operator input means and said transmission state sensing means, and said ignition sensing means, said logic control unit performing Boolean operations on said desired transmission state signal, said present transmission state signal and said ignition on signal for determining if said desired transmission state differs from said present transmission signal, for controlling the electric power means to shift the transmission to the transmission state as indicated by said desired transmission state if said desired transmission state signal differs from said present transmission state signal, and for controlling the electric power means to shift the transmission to the transmission state of park if said ignition sensing means determines the motor vehicle is not switched on.

44. An electrical control apparatus for control of an automatic transmission apparatus in a motor vehicle having a plurality of transmission states including the transmission state of park, the motor vehicle including a brake pedal for actuation of a motor vehicle brake system and including an electric power means adapted for change of the transmission state, said electrical control apparatus comprising:

an operator input means for generating a desired transmission state signal corresponding to manual operator input;

a transmission state sensing means for generating a present transmission state signal indicative of the state of the automatic transmission apparatus;

a brake sensing means for generating a brake depress signal when the brake pedal is depressed; and a logic control unit connected to the electric power means, said operator input means, said transmission state sensing means, and said brake sensing means for determining if said desired transmission state signal differs from said present transmission state signal, for controlling the electric power means to shift the transmission to the transmission state indicated by said desired transmission state signal if said desired transmission state signal differs from said present transmission state signal, and for inhibiting control of the electric power means and precluding shifting of the transmission out of the state of park when said present transmission state signal indicates the automatic transmission apparatus is in the transmission state of park and said brake depress signal is not received.

* * * * *

UNITED STATES PATENT AND TRADEMARK OFFICE
CERTIFICATE OF CORRECTION

PATENT NO. : 4,817,471

DATED : April 4, 1989

INVENTOR(S) : Tury

It is certified that error appears in the above-identified patent and that said Letters Patent is hereby corrected as shown below:

On the title page Assignee of record is AP Aero, Inc., Sterling Heights, Michigan.

Item [63] "62,755" should be --62,775--.

Column 1, line 9, "62,775" should be ---62,755---.

Column 7, line 45, "facia" should be --fascia--.

Column 8, line 18, "transistion" should be --transition--.

Column 8, line 23, "tramission" should be --transmission--.

Column 9, line 65, "illunination" should be --illumination--.

Column 20, line 22, "breaking" should be --braking--.

Column 22, line 11, "correspons" should be --corresponds--.

Column 22, line 19, "mils" should be --miles--.

Column 25, line 44, "breaking" should be --braking--.

Signed and Sealed this

Fifth Day of June, 1990

Attest:

HARRY F. MANBECK, JR.

*Attesting Officer*     *Commissioner of Patents and Trademarks*